Aug. 18, 1931.  J. RAWYLER  1,819,038
CASH REGISTER
Filed Aug. 14, 1924    9 Sheets-Sheet 5

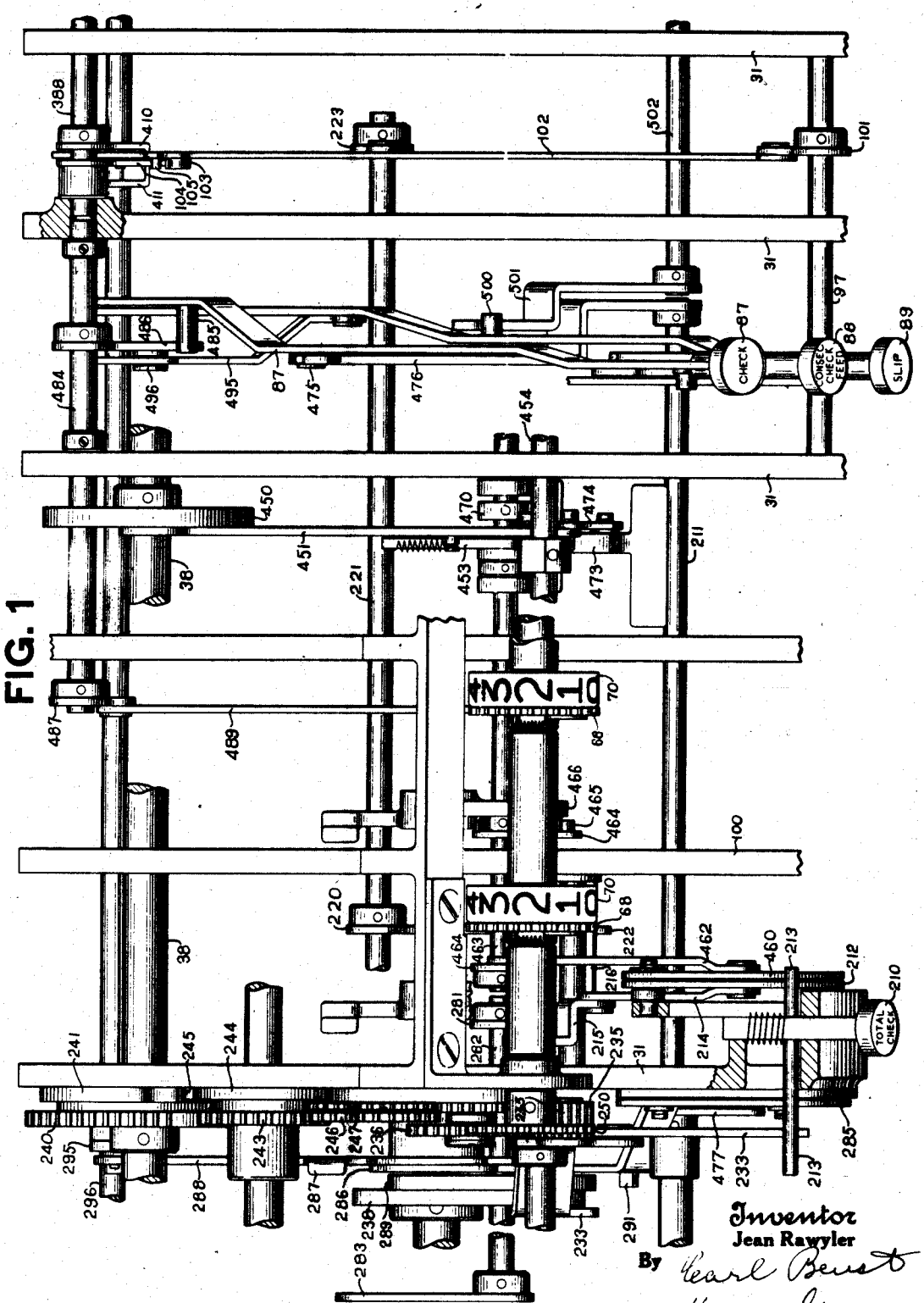

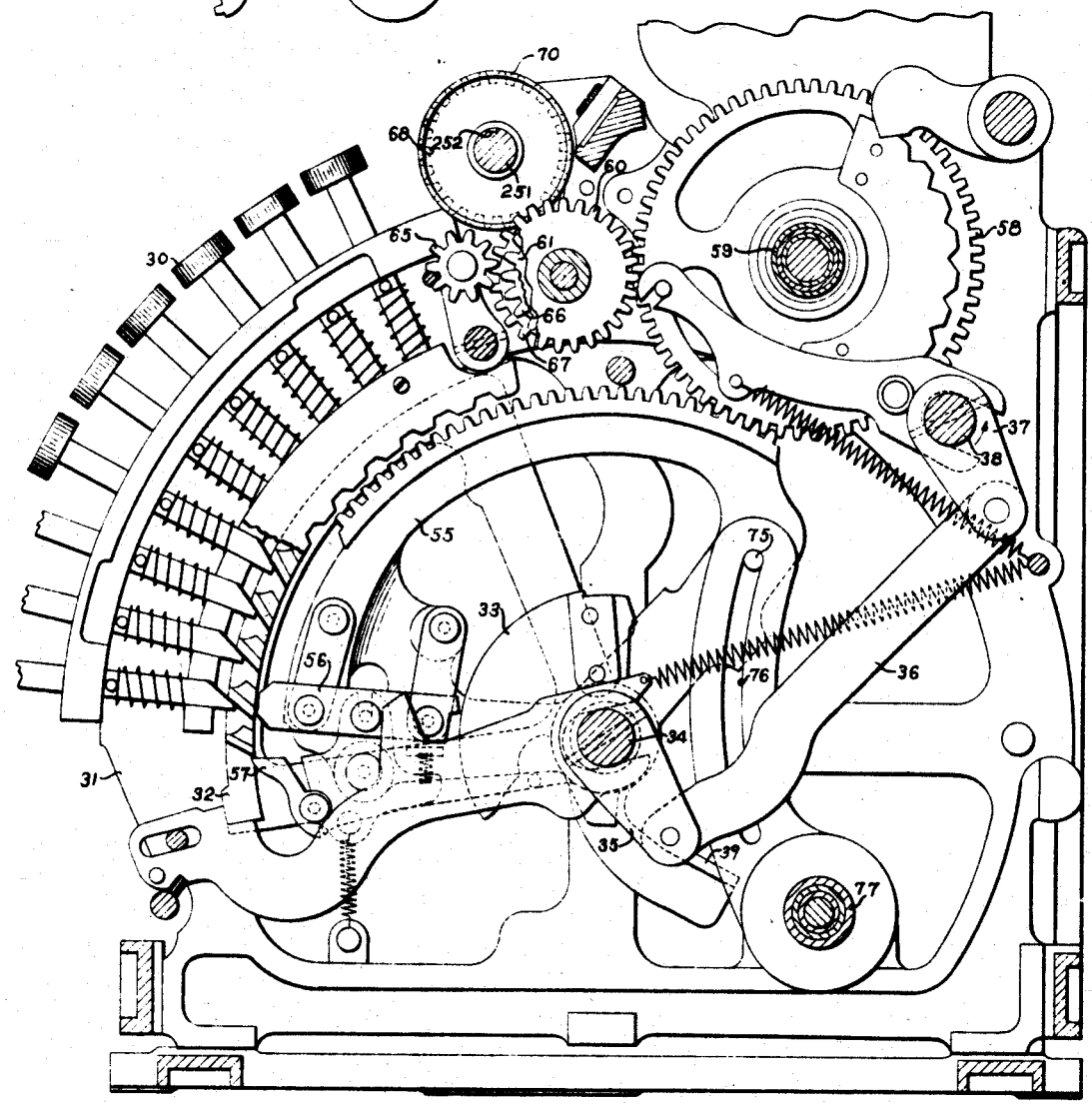

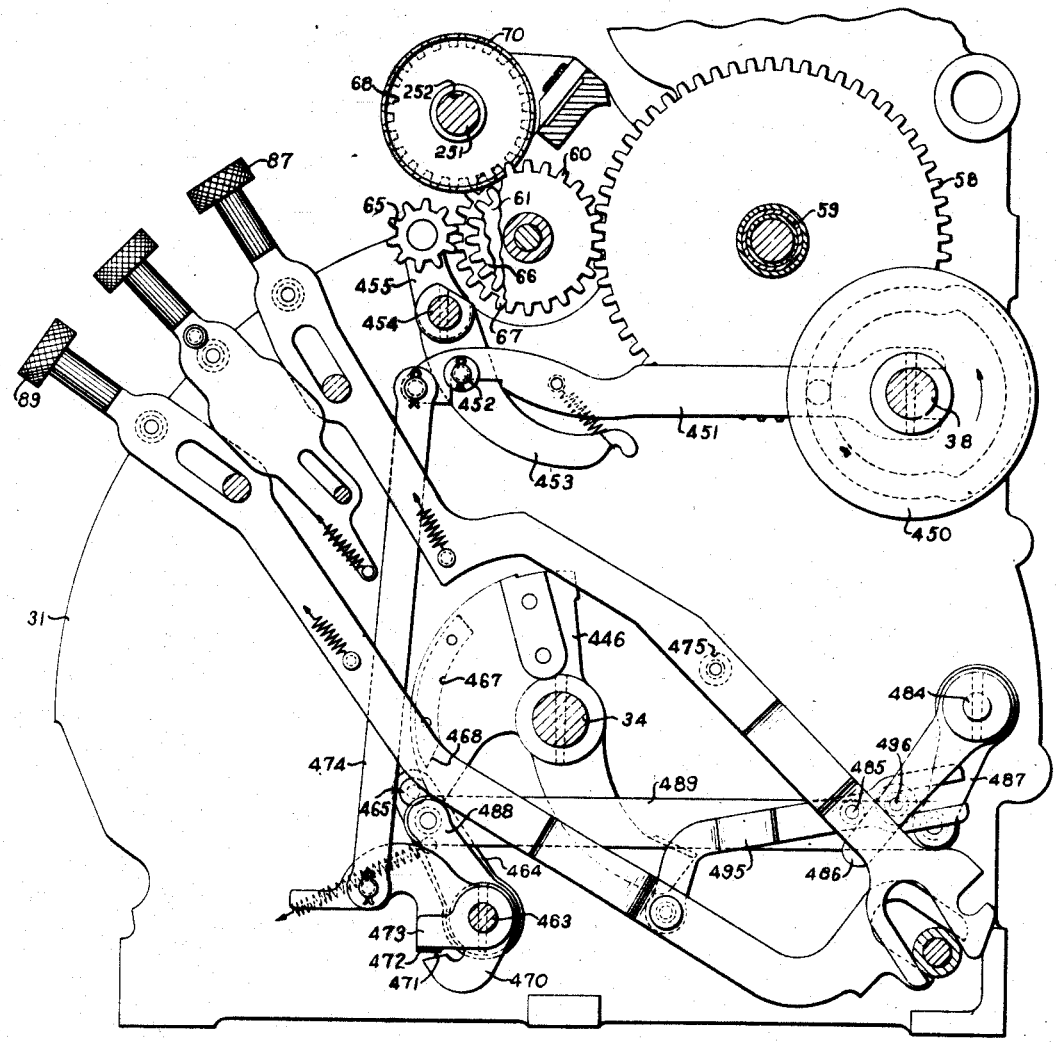

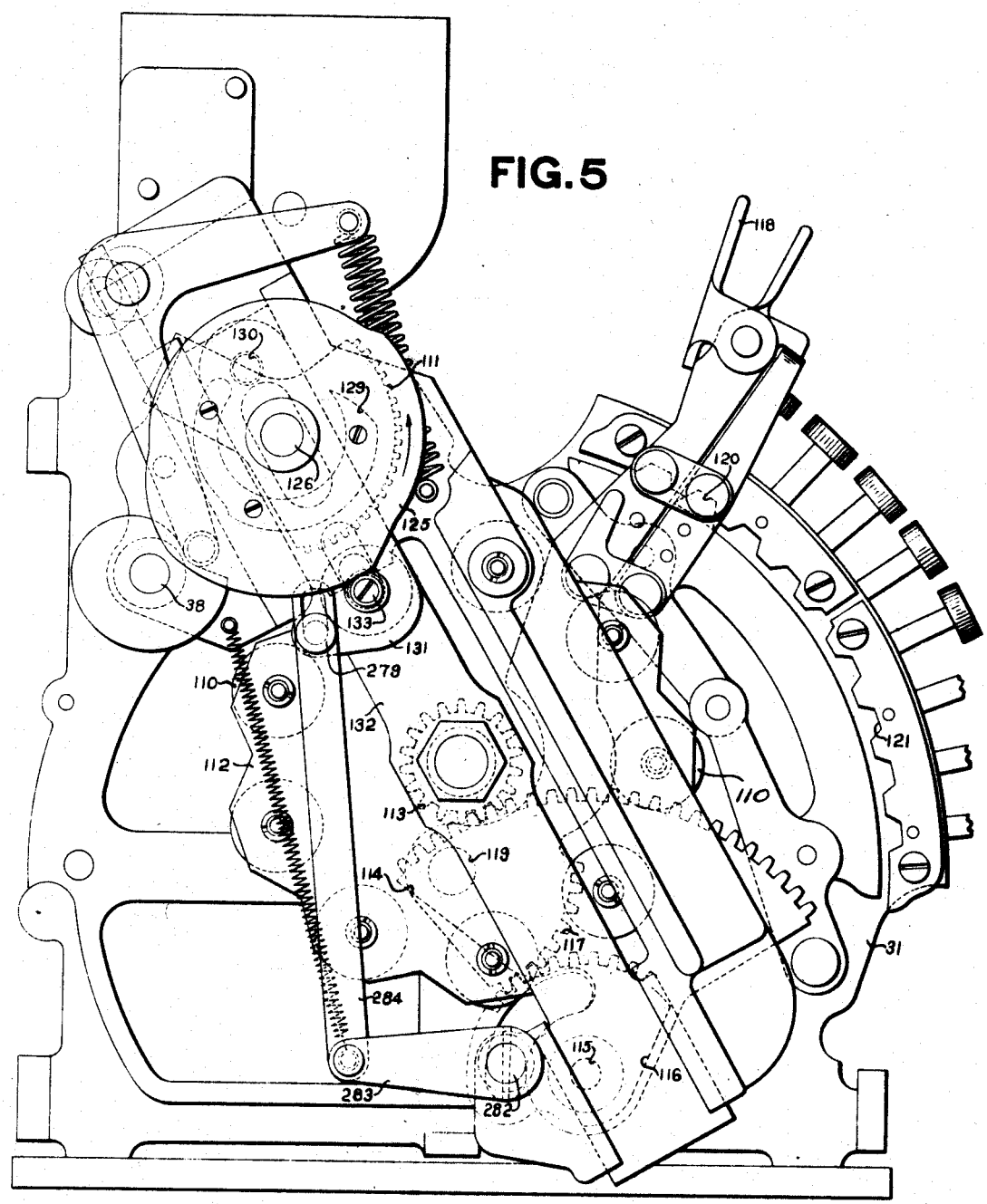

Inventor
Jean Rawyler
By Carl Beust
Henry E. Stauffer
His Attorneys

Aug. 18, 1931.   J. RAWYLER   1,819,038
CASH REGISTER
Filed Aug. 14, 1924   9 Sheets-Sheet 6

Inventor
Jean Rawyler
By Carl Beust
Henry E Stauffe
His Attorneys

Aug. 18, 1931.  J. RAWYLER  1,819,038
CASH REGISTER
Filed Aug. 14, 1924   9 Sheets-Sheet 7
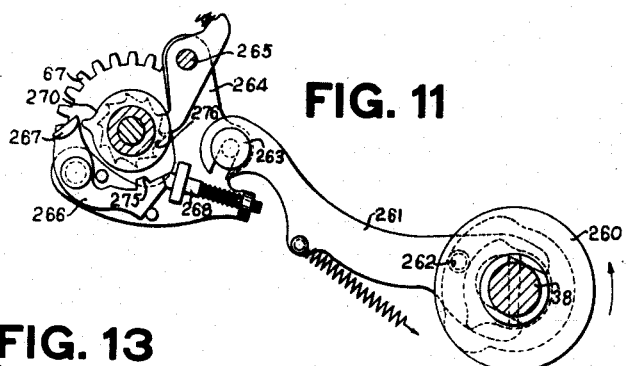
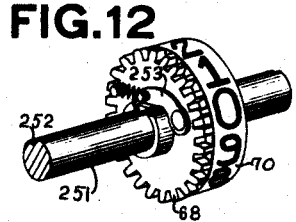
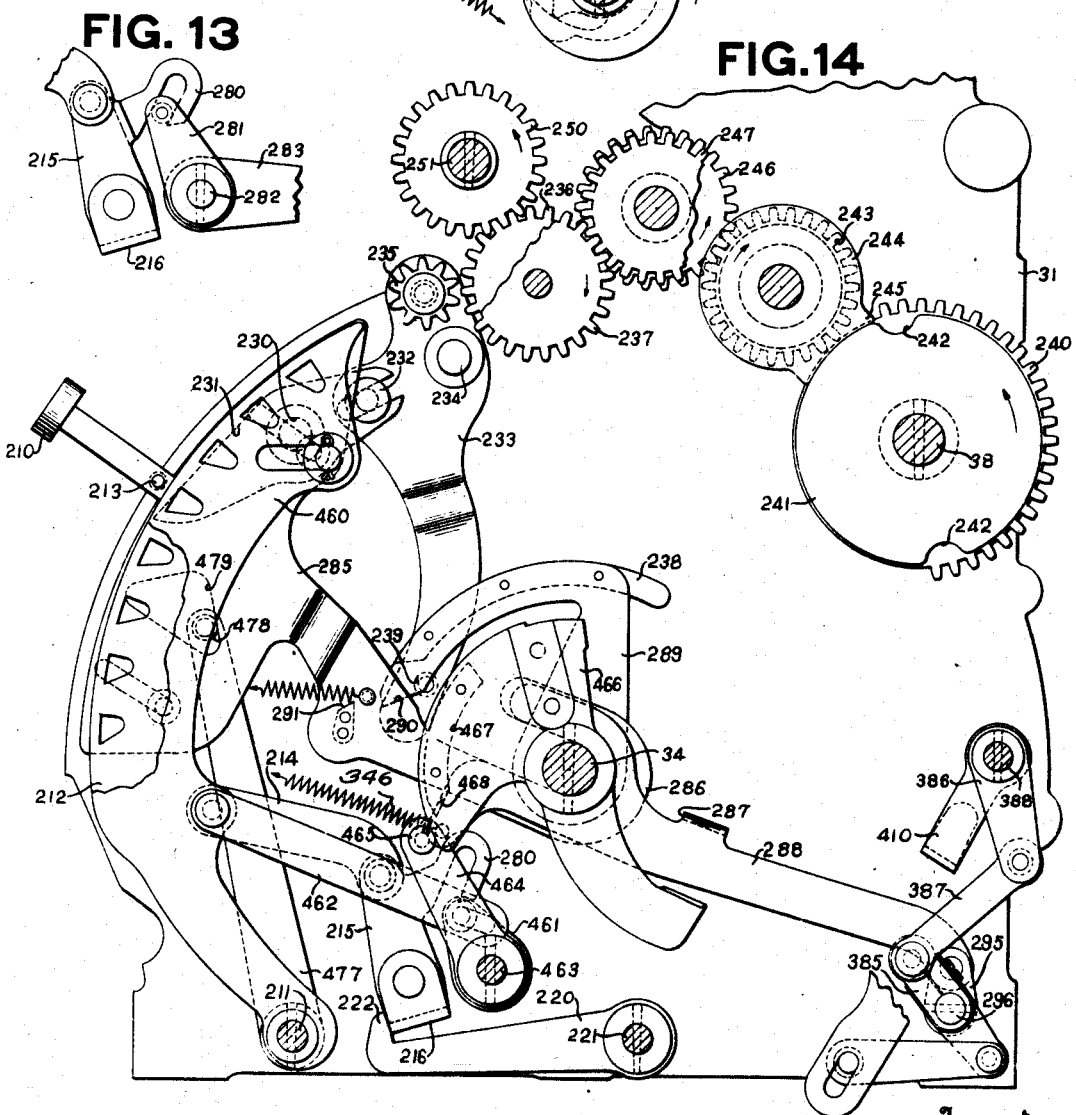
Inventor
Jean Rawyler
By
His Attorneys Aug. 18, 1931.                J. RAWYLER                1,819,038
                              CASH REGISTER
                        Filed Aug. 14, 1924        9 Sheets-Sheet 8
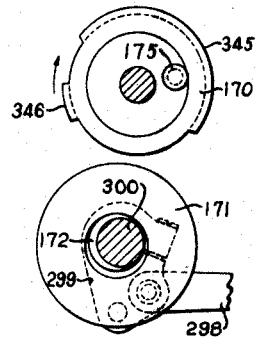
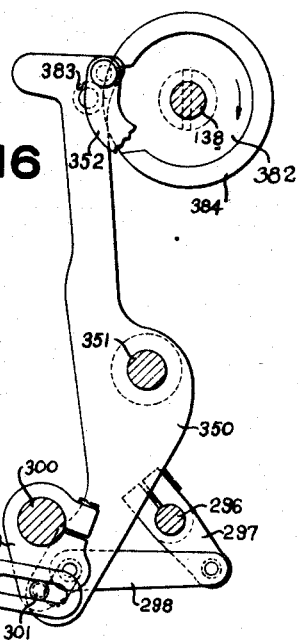
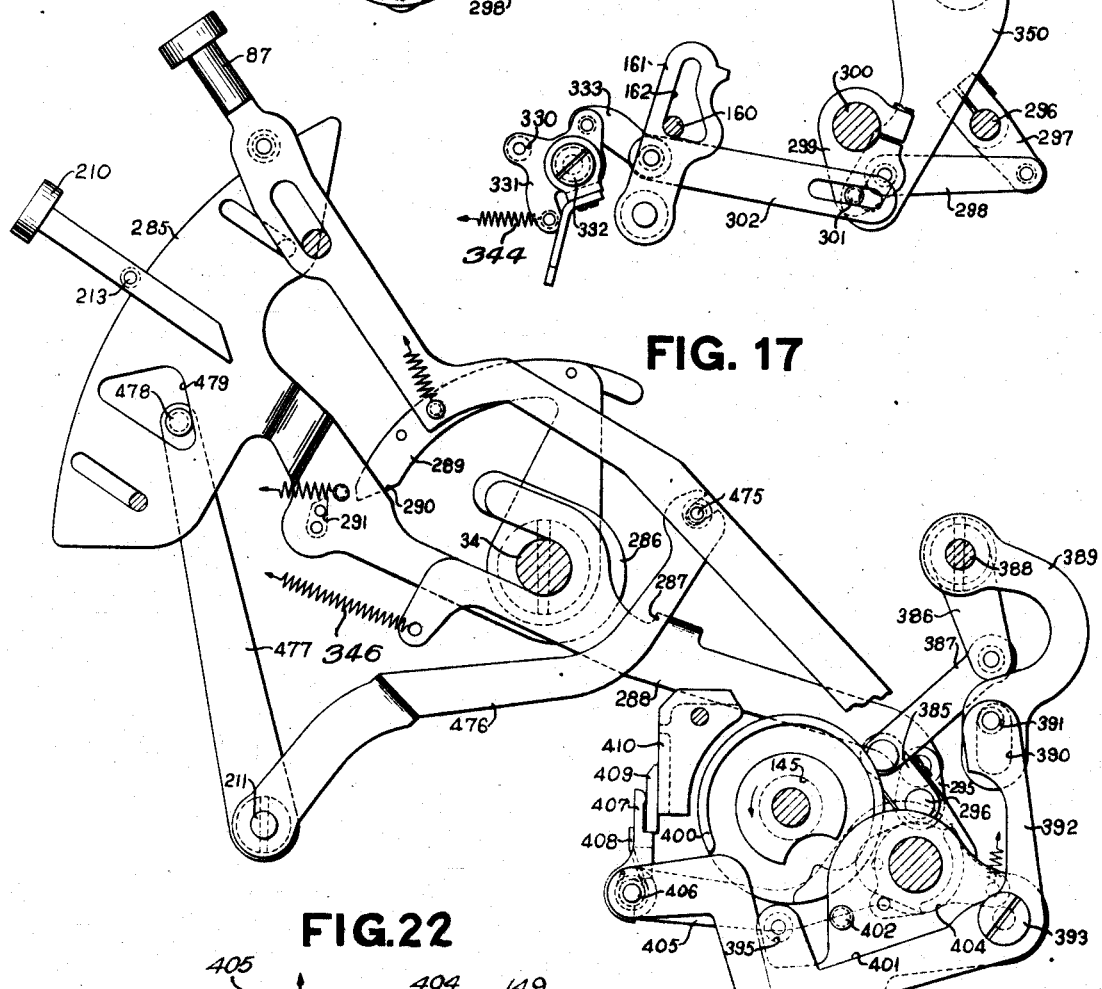
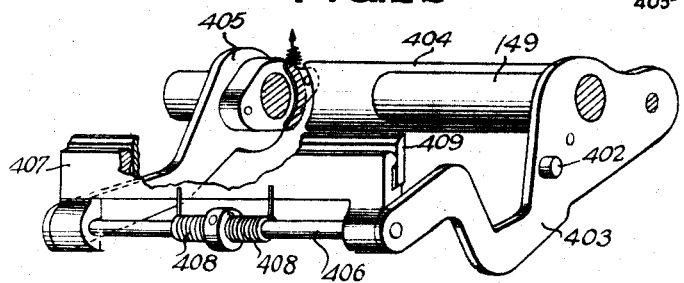

Aug. 18, 1931.  J. RAWYLER  1,819,038
CASH REGISTER
Filed Aug. 14, 1924  9 Sheets-Sheet 9

Inventor
Jean Rawyler
By Earl Beust
Henry E Stauffer
His Attorneys

Patented Aug. 18, 1931

1,819,038

UNITED STATES PATENT OFFICE

JEAN RAWYLER, OF PARIS, FRANCE, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed August 14, 1924. Serial No. 732,016.

This invention relates to improvements in cash registers, and more particularly to the type of machine shown in Letters Patent of the United States, No. 1,198,492, issued to Edward J. Von Pein on September 19, 1916, and to the type of machines for issuing an itemized check having a perforated stub.

The principal object of this invention is to provide mechanism for controlling a subtotalizer by an item key and a total key, so that, the items may be entered into the subtotalizer and simultaneously printed on a check, the total on the subtotalizer printed on the check in duplicate and the subtotalizer automatically turned to zero.

Another object is the provision of mechanism for perforating between duplicate impressions representing single item transactions, and between duplicate impressions representing totals of a plurality of items involved in a single transaction.

Another object is to provide means for properly controlling the feed of the check, i. e., for giving the check a long feed at the beginning of every multiple item transaction, to advance the check from the knife to a position for printing the first item on the check; for giving the check a short feed during every item entering operation, to properly space the printed items on the check; and for giving the check a double feed during total printing operations.

Another object is to provide a mechanism for controlling the classification totalizers so that the amount will be added into the classification totalizers during item entering operations, and so that the classification totalizers are disabled when the total of the items is printed.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said figures:

Fig. 1 is a plan view of the various mechanisms under control of the check, consecutive check feed, slip and total keys.

Fig. 2 is a detail view showing the means for setting the amount printing wheels.

Fig. 3 is a sectional view showing the type of machine to which the improvement is applied.

Fig. 4 is a detail view of the mechanism under control of the check and slip keys.

Fig. 5 is a left side elevation of the classification totalizers and the mechanism for controlling the engaging and disengaging thereof with and from the actuators.

Fig. 11 is a detail view showing the transfer mechanism for the subtotalizer.

Fig. 12 is a detail perspective view of the subtotalizer indicating wheel, and shows the method of mounting the turn-to-zero pawl thereon.

Fig. 13 is a detail view showing a part of the mechanism for disabling the classification totalizers.

Fig. 14 is a detail view of the mechanism under control of a total key, and shows the means for turning the subtotalizer to zero.

Fig. 15 is a detail view of the mechanism for controlling the double feed of the check or receipt strip during single item and total printing operations.

Fig. 16 is a detail view of the mechanism for controlling the knife, perforator and ejector mechanisms.

Fig. 17 is a detail view showing the means for throwing on the knife mechanism under control of the total and receipt keys.

Fig. 22 is a detail view showing the knife operating arms.

Figure 6:
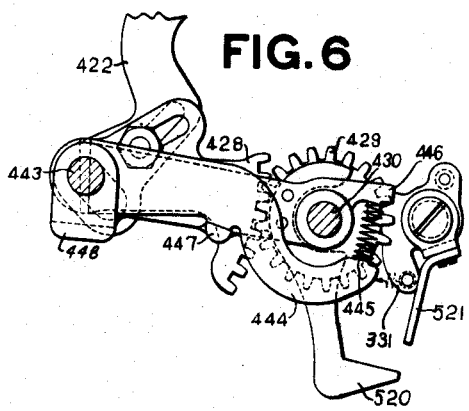
Fig. 6 is a detail view of the mechanism for operating the check ejector.

Described in general, the machine includes a plurality of banks of amount keys, a bank of release keys, as a check, consecutive check and slip keys, and a total check key. The amount banks control the entry of items into a subtotalizer, and also into a group of classification totalizers. After a given number of items have been entered into the subtotalizer, the operator will read the subtotalizer and set up the total amount thereof on the keyboard and operate the machine. This sets the type wheels, and prints the total. Three types of operations are possible with the present machine. In one the transaction to be entered in the machine comprises only one item and is known as a single item transaction. In this type of operation, the check key is depressed for releasing the machine and an ordinary stub check receipt is issued. The amount, in this type of transaction, is not added into the subtotalizer, but is added into the classification totalizer. Means is provided so that the amount can be printed upon a sales slip. When a slip is placed in the machine, the slip key is used to release the machine, and the mechanism for severing and perforating the check, which is normally ineffective or "off," remains "off." The second type of operation is where the transaction includes a number of items, and will be known herein as a "multiple item transaction." In entering the multiple items, the consecutive check key is depressed and the items are simultaneously added into the subtotalizer and into the classification totalizers.

The third type of operation is one wherein the total of a multiple item transaction is printed, and will be referred to more at length, hereafter.

Described in detail, each of the several amount banks has nine keys 30 (Fig. 3) mounted between the side frames 31, each key adapted to be depressed and held in the depressed position by a detent 32 as shown in the patent to J. P. Cleal, No. 587,298, issued August 3, 1892. A driver 33 secured to a shaft 34 is given a rocking movement upon every operation of the machine, by an arm 35, link 36 and crank 37 secured to a main operating shaft 38. An operating handle (not shown) is clutched to a sleeve 45 (Fig. 8) secured to a pinion 46 meshing with an idler gear 47, which meshes with a gear 48. The gear 48 meshes with a gear 49 secured to the side of a smaller gear 50 fast on the shaft 38, and is given a complete rotation in the direction shown by the arrow during every operation of the machine. The shaft 38 rotates the crank 37 (Fig. 3) a complete revolution, and due to the fact that the arm 35 is longer than the crank 37 the driver 33 rocks first clockwise and then counter clockwise through a constant path during each operation of the machine. A differentially driven toothed segment 55 to which a latch 56 is pivotally connected, is provided for each bank of amount keys. The driver 33 has a rearwardly extending arm 39, which contacts the segment 55 during its counter-clockwise movement, to restore the segment to its lowermost position. Clockwise movement of the driver will rock the differential segment 55 by means of the latch 56 until a nose 57 of the latch engages the depressed key.

The segment 55 meshes with a gear 58 secured to a sleeve 59 of a nest of sleeves, one for each bank of keys. The gear 58 meshes with a small pinion 60 having secured to its side a smaller pinion 61. When it is desired to enter an amount into the subtotalizer 70, a wide pinion 65 shifts into engagement with the pinion 61 and a pinion 66 adjacent the pinion 61 to couple them together. The above mechanism is all old and well known in the art, and a more detailed description thereof may be had by referring to the patent to Cleal and Reinhardt, No. 580,378. The pinion 66 is secured to a gear 67 meshing with a gear 68 secured to the side of a subtotalizer indicator wheel 70. The several gears 68 and their numeral wheels 70 are journaled for independent rotation on a totalizer shaft 251 hereinafter referred to.

The following mechanism is provided for setting the type wheels. Mounted on the segment 55 is a stud 75 engaging a slot 76 in an arm secured to one of a nest of sleeves 77 (Figs. 2 and 3). Near the right hand end of each sleeve 77, and mounted thereon, is a segment 78, one for each bank of keys. These segments 78 mesh with pinions 79 sleeved to the type wheels 80. From this it can be seen that the differential positioning of the segments 55 will set the printing wheels 80 commensurate with the keys depressed.

Release mechanism

Before the operating mechanism can be turned, the machine must be released. The release mechanism is old and well known, and only a brief reference thereto will be made. A detailed description of this mechanism can be had by referring to Letters Patent of the United States of C. F. Kettering and W. A. Chryst, No. 1,144,418, issued on June 29, 1915. Secured to a key lock line 801 (Fig. 9) is an arm 81 carrying a pawl 82. As is well known in the art, the key lock line tends to rotate in clockwise direction. This clockwise movement is normally prevented by a flattened stud 83 mounted on a detent 84. The detent 84 has a cam slot 85 adjacent each pin 86 mounted on each of the release keys 87, 88 and 89. The key 87 will be hereinafter known as the "check key", the key 88 as the "consecutive check feed key" and the key 89 as the "slip key". Upon depression of any one of these three keys, the detent 84 is moved towards the back of the machine and thereby slides the stud 83 off the top of the pawl 82 to permit the key lock line 801 to rotate and release the machine. The means whereby the rocking of the key lock line 801 will permit the rotation of the crank handle is shown in the patent to Thomas Carroll, No. 703,639.

Multiple item transaction

Figure 9:
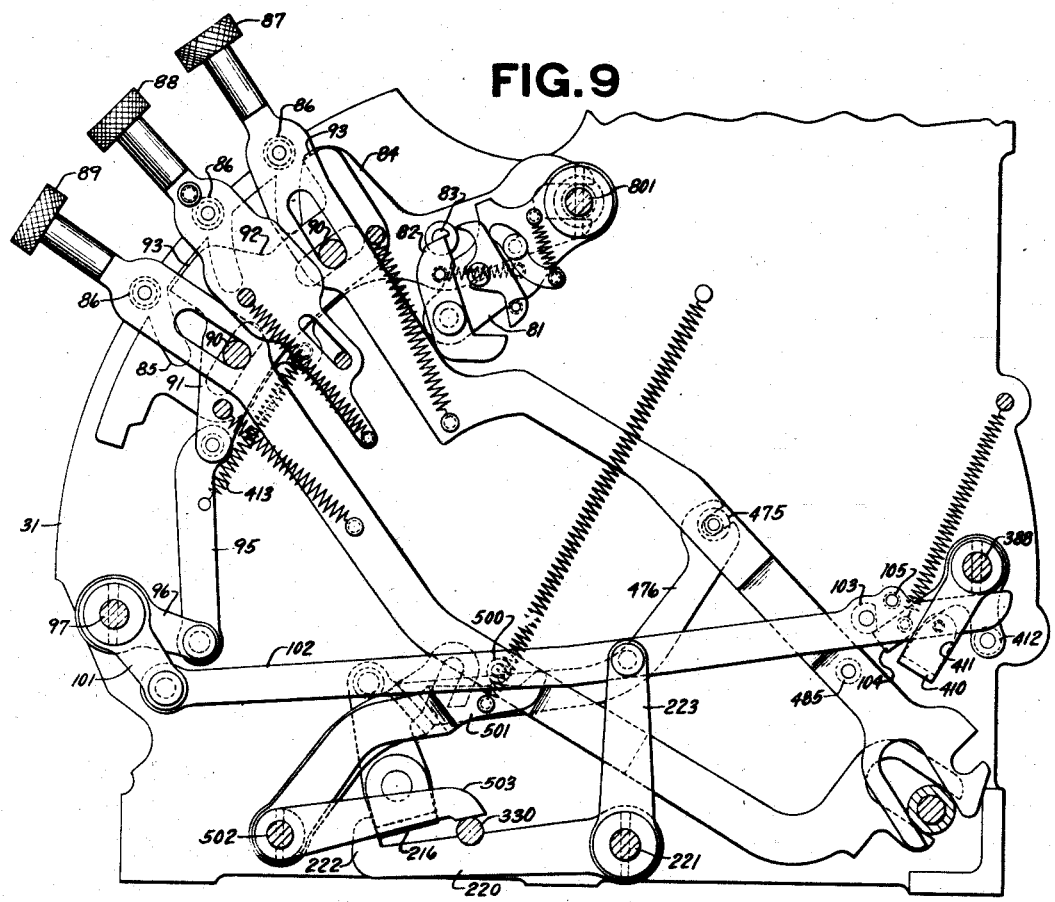
Fig. 9 is a detail view of the interlocking mechanism between the check and slip keys and the total key.

When a transaction consisting of more than one item is to be entered into the machine, the amounts are set up on the keyboard by depression of the keys 30. The machine is then released by depressing the consecutive check feed key 88 (Fig. 9). When the key 88 is depressed, the check and slip keys are locked out to prevent their depression until after a total of the items entered into the subtotalizer has been printed. The means for preventing the depression of these keys during the entry of the multiple items will now be described. Slidably mounted on two studs 90 (Fig. 9) is a detent 91 having an inclined edge 92 in the path of the pin 86 of the consecutive check feed key 88. When this key is depressed, the pin 86 moves the detent 91 so that the high faces 93 thereof are positioned beneath the pins 86 of the check and slip keys 87 and 89. The detent 91 is connected by a link 95 with an arm 96 secured to the shaft 97 mounted in the frames 31 (Figs. 1 and 9). Also secured to the shaft 97 is an arm 101 connected to a horizontal link 102 extending towards the back of the machine. Near the rear end of the link 102 is a flattened stud 103 which lies in the path of one arm of a spring-actuated bell crank 104. Upon depression of the key 88, the link 102 is moved towards the front of the machine, thereby permitting the arm of the bell crank 104 to be pulled up in the path of the flattened stud 103 so as to prevent the return of the bell crank 104. From this it can be seen that so long as the arm of the bell crank 104 remains in the path of the stud 103, the detent 91 is held against the tension of its spring 413 in such a position that the high faces 93 remain directly under the pins 86 of the check and slip keys and prevent their depression. The mechanism for disengaging the bell crank 104 from the stud 103 will be hereinafter described in connection with the total printing operation. It is sufficient to state here that these two keys 87 and 89 are locked out until after a total printing operation.

Classification totalizers

The classification totalizers are of a type which is well known in the art and a detailed description can be had by referring to Letters Patent of the United States, No. 938,527, issued to Edward J. Von Pein on Nov. 2, 1909. In the present machine, nine classification totalizers 110 (Fig. 5) are used. Segments 111 are secured to the sleeves 59 (Fig. 3), and are actuated by the differential mechanism, as before described, to simultaneously enter the amount in the selected classification totalizer 110 with its entry into the subtotalizer 70.

Means is provided for selecting the particular classification totalizer into which the amounts are to be entered. The totalizers are mounted in a rotatable frame 112 (Fig. 5) which has secured thereto a pinion 113 meshing with a segment 114 pivoted on a stud 115. Secured to the side of the segment 114 is a segment 116 meshing with teeth 117 formed in the lower edge of a pinch lever 118 pivoted on a stud 119. The keyboard is provided with indices (not shown) to guide the operator in positioning the lever 118 corresponding to the totalizer into which the amounts are to be entered. The lever 118 is held in the proper position by a block 120 adapted to engage the apropriate one of the notches 121 in a bar secured to one of the frames 31. Before the lever can be shifted from one position to another it is necessary to rock the upper finger-piece of the pinch lever, to disengage the block 120 from its notch 121 in the usual manner, thereby permitting movement of the lever.

The totalizer-supporting frame 112 is rotatably mounted on a slide 132 to permit the totalizer selected by the pinch lever 118 to be rocked into engagement with the actuating segments 111. In order to accomplish this, a cam 125 is secured to a shaft 126 (Fig. 5). The shaft 126 is given a complete rotation by the before described pinions 46, 47, and 48 (Fig. 8) upon each operation of the machine. The pinion 48 is pinned to the shaft 126. The cam 125 (Fig. 5) has secured to its side a circular cam rib 129 which is adapted to contact a roller 130 mounted on a bar 131 loosely mounted on the slide 132 of the classification totalizer frame. Upon counterclockwise movement of the cam 125 (Fig. 5), the circular cam rib 129 contacts the roller 130 and cams the bar 131 upward. The bar 131 has a slot through which projects a stud 133 mounted on the slide 132. Upward movement of the bar 131 draws the slide 132 towards the actuating segments 111. From the above it can be seen that any one of the classification totalizers 110 can be selected and engaged with the actuating segments 111, whereupon the amount set up on the keyboard will be entered therein.

This totalizer engaging and disengaging mechanism is disabled when taking totals, and will be described when considering that function of the machine.

Item printing mechanism

Figure 8:
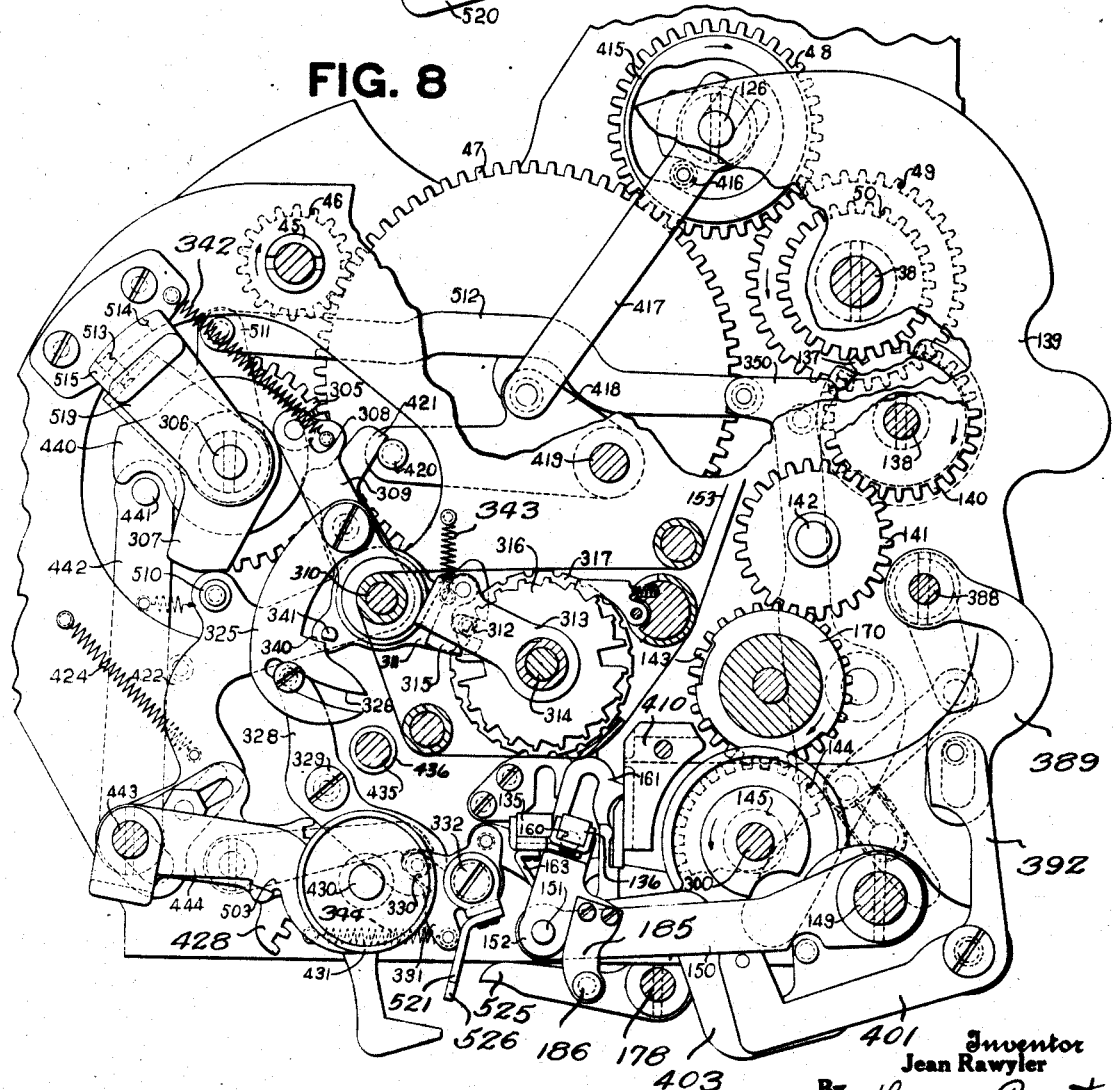
Fig. 8 is a section taken through the printer and looking toward the left end of the machine.
Figure 21:
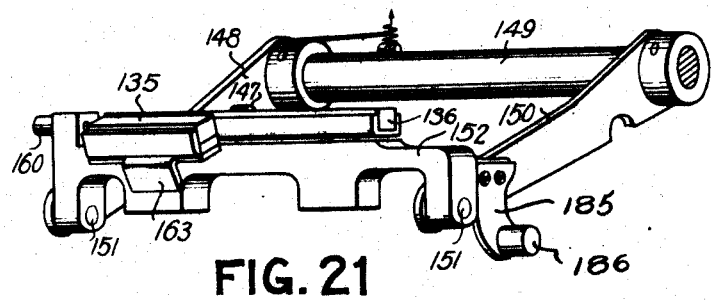
Fig. 21 is a detail view showing the construction of the printing hammer.

The check paper upon which the items are to be printed is fed between the type wheels and the printing hammer by mechanism to be described when considering the check feeding mechanism. By referring to Fig. 18, it can be seen that in recording the items of a multiple item transaction, only the amount, together with the special characters designating the kind of entry, (in this case a multiple item is represented by a star) and the number of the classification totalizer into which the item is added, are printed. However, when a total of a multiple item transaction is printed, the consecutive number and date are printed in addition to the total amount, and the special characters just mentioned. When a single item transaction is entered, the amount, special characters, consecutive number and date are all printed together. To obtain these results, a printer hammer is provided with two platens, one of which is a short platen and prints only the amounts of the items of multiple item transactions and the special characters. This platen is designated by 135 (Figs. 8 and 21). Another platen, 136, is provided to print the amounts of single item transactions, the total of multiple item transactions, the special characters, the consecutive number and the date. The printing hammer is automatically controlled to rock on its pivots 151 so as to bring either of the platens 135 or 136 into position to take the impression from the type line, only one type line being provided for both item and total printing. Thus when the consecutive check feed key 88 is depressed, the short platen 135 is controlled to shift into position to take the impression, and when the check key 87 is depressed for releasing the machine for a single item entry, the wide platen 136 is controlled to shift into printing position. When the machine is released for total printing, the wide platen 136 shifts into the printing position in exactly the same manner as when the machine is released by the check key 87 for a single item entry.

Figure 7:
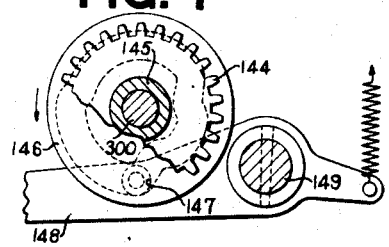
Fig. 7 is a detail view of the cam for operating the printer hammer.

The mechanism for forcing the printing platens against the type wheels is as follows: Meshing with the pinion 50 (Fig. 8) is a pinion 137 secured to a shaft 138 supported between the right hand frame 31 and a printing frame 139. Also secured to the shaft 138 is a gear 140 meshing with a gear 141 loosely mounted on a stud 142 secured in the printer frame 139. A gear 143 meshes with the gear 141 and with a gear 144 (Figs. 7 and 8) secured to a sleeve 145 loose on a shaft 300. Also secured to the sleeve 145 is a printer cam 146 (Fig. 7) having a cam race traversed by a roller 147 mounted on an arm 148 (Fig. 21). The arm 148 is pinned to a shaft 149 which has secured thereto an arm 150 (Figs. 8 and 21) similar to the arm 148. Studs 151 mounted on the arms 148 and 150 pivotally carry a printer hammer 152. The hammer 152 has mounted on one end thereof a pin 160 (Figs. 8, 16 and 21). A pivoted guide arm has a slot 162 entered by the pin 160 to guide the hammer 152 in the proper path when being rocked by the cam 146 (Fig. 7). This guide arm 161 is adapted to be shifted during total printing operations. As shown in the drawings the hammer is in the position which it assumes when printing multiple items. The shorter platen 135 is positioned alongside of the longer platen 136, and is supported by a small bracket 163 secured to the support for the platen 136. The bracket is braced against the hammer 152. When the printer cam 146 is rotated, the arms 148 and 150 will carry the platen 135 upwardly to press a ribbon 153, and the paper against the type wheels, and the item which has been previously set thereon, will be printed on the check paper.

Paper feeding mechanism

Figure 10:
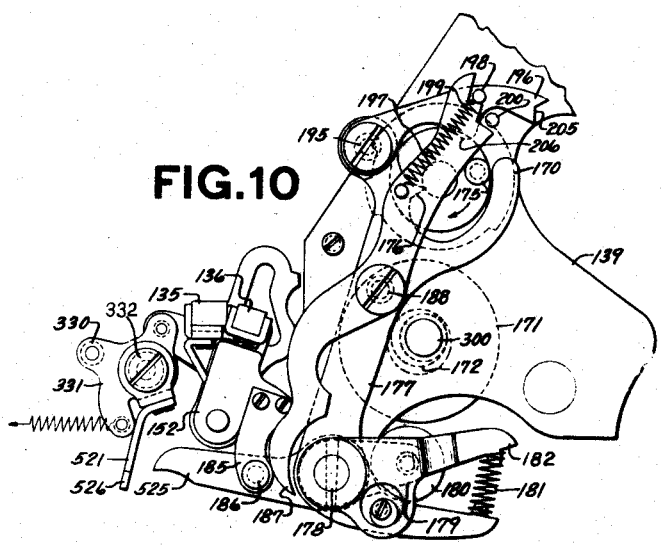
Fig. 10 is a detail view showing the mechanism for controlling the various feeds of the check.
Figure 18:
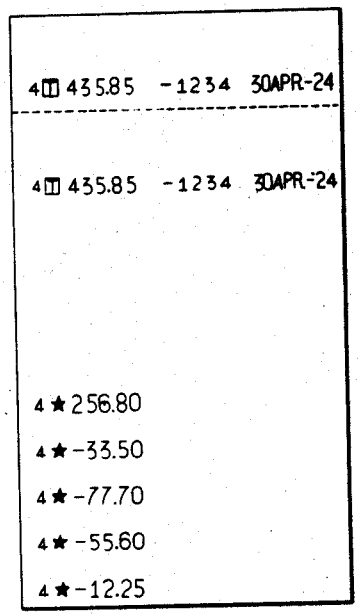
Fig. 18 is a facsimile of a printed receipt issued by the machine.

In entering multiple item transactions, the feeding mechanism for the check must be controlled so that the check paper will be fed a greater distance when the first item of a multiple item transaction is printed than when the subsequent items of the same transaction are printed. The reason for this is that the paper must be fed from a position at which it has been severed by the knife, to the proper position at the printing line. This distance is somewhat greater than the distance required for spacing the items (Fig. 18). The mechanism for controlling this feed is best shown in Fig. 10. The mechanism in this figure is shown in the position in which it is left after an item has been printed on the check, or in other words, after a short feed of the check. A description of a short feed will be given before considering the initial long feed. A feed roller 170 (Figs. 8, 10 and 15) is secured to the beforementioned gear 143 and is rotated, not only during item entering transactions but also during total taking operations. It will be noticed that two feed rails are provided thereon, one of which is longer than the other. Only a portion of the long feed rail is used in feeding the check during item entering transactions. Adjacent to the feed roller 170 is another paper feed roller 171 mounted on an eccentric 172. The bore of the roller 171 is of greater diameter than the diameter of the eccentric 172, to permit the roller 171 to be pressed against the feed roller 170 without moving the eccentric 172. Secured to the side of the roller 170 is a stud 175 (Fig. 10) adapted to engage a lug 176 on the forked arm of a bell crank lever 177 pivoted on a short shaft 178 mounted in the printer frame 139. Secured to the shaft 178 is an arm 179 carrying a lifting roller 180. Movement is transmitted from the shorter arm of the bell crank lever 177 to the arm 182 by means of a spring 181. Upon rotation of the roller 170, the stud 175 wipes past the lug 176 of the bell crank 177 and rocks the bell crank counter-clockwise. The shorter arm of the bell crank lever is thus caused to compress the spring 181 and rock the arm 182 and the shaft 178 to which it is fastened, in counter-clockwise direction. The shaft 178 is thus caused to rock its arm 179 upwardly carrying the lifting roll 180 against the roller 171 to raise said roller 171 so that the check paper is temporarily contacted by the paper feeding rollers 170 and 171. On continued rotation of the roller 170 by its gear 143, the stud 175 passes the lug 176, whereupon the bell crank lever 177 and lifting roller 180 drop back to their normal positions. From this it can be seen that the rollers 170 and 171 will be in engagement with the check paper for a very short time, and therefore, the check paper feeds a short distance, equal to one space, between the printed items, as shown in Fig. 18.

When printing totals, or when printing single item transactions, either on a check or on a slip, the platen 136 which lies in the same radius with the printing hammer 152, is rocked to the left (Fig. 10) far enough so that it will engage the type wheels on the printing line upon subsequent operation of the printing hammer. The means for rocking the platen will be described when considering the total printing operation. It is sufficient to mention here that this rocking of the platen 136 to effective position sets up a condition in the paper feeding mechanism so that the paper feed roller 171 will be in engagement with the paper feed roller 170 a greater length of time during the next succeeding operation of the machine. It should be noted that the feeding of the paper occurs before the printing operation, and therefore, the amount of feed to be given the paper during the first transaction-entering operation is controlled by the previous operation. A long feed is necessary at the beginning of each transaction entry, because, the paper must be fed from the knife to the printing position before the first item can be printed on the check. By referring to Fig. 8 it can be seen that the severed end of the check paper is back of the printing line and that no paper is in position to be printed upon. Therefore, before an impression can be made, it is necessary to feed the paper into printing position. However, the short feed above described is not long enough to feed the paper from the knife to the printing position, it being only enough to space the printed items apart.

The mechanism for obtaining a longer feed during the first operation after a transaction has been completed, will now be described.

Secured to the hammer 152 is a depending bracket 185 carrying a stud 186 lying in the path of one arm of a lever 187 pivoted at 188 to the above mentioned bell crank lever 177. Also pivoted on the bell crank lever 177 on a stud 195 is a dog 196 actuated by a spring 197 and carrying a stud 198 engaging a shoulder 199 on the remaining arm of the lever 187. When the platen 136 is rocked to the left (Fig. 10) during total taking operations, the bracket 185 likewise rocks and its stud swings the lever 187 counter-clockwise far enough to disengage the shoulder 199 from the stud 198, thereby permitting the dog 196 to be pulled down against a stud 200 on the frame 139, where it remains during the next operation of the machine. Upon rotation of the roller 170 during the next operation the stud 175 thereon contacts the lug 176 and rocks the bell crank lever 177 to the left in the same manner as described for the short feed. However, the rocking movement of the bell crank lever 177 is sufficient to carry the dog 196 far enough to the left to permit the notch 205 thereof to engage the stationary stud 200. It can be seen that after the stud 175 on the paper feed roller 170 passes the lug 176 the bell crank lever 177 is held in the rocked position by the engagement of the dog 196 with the stud 200. This holds the lifting roller 180 in contact with the lower paper feed roller 171, which in turn holds the check paper in engagement with the upper feed roller 170 after the pin 175 has passed the lug 176. Upon further movement of the feed roller 170, the pin 175 wipes against a projection 206 on the lower side of the dog 196 and cams the dog off of the stud 200, thereby permitting the bell crank lever 177 to return to its normal position. The pin 175 cams the dog 196 far enough to permit the shoulder 199 on the lever 187 to again position itself under the stud 198 of the dog. The mechanism will, therefore, come to rest in the position shown in Fig. 10.

Since the platen 136 is rocked to the left when entering single item transactions, or when printing a total of a multiple item transaction, and since this movement of the platen 136 controls the feed of the check paper for the next operation of the machine, it can be seen that the long feed for advancing the paper from the knife to the printing position is always obtained during the initial item entering operation of a transaction.

Mechanism for unlocking the total key

A mechanism is provided to prevent depression of a total key 210 (Figs. 1, 14 and 17) until after an item has been entered in the subtotalizer. However, after the first item has been entered, this mechanism is rendered ineffective. Loose on a shaft 211 supported by the frames 31, is an arm 212 adapted to be engaged by a pin 213 projecting from the total key 210. Pivoted to the arm 212 is a link 214 which is also pivoted to one arm 215 of a yoke 216. The mechanism in Fig. 14 is shown in the position which it assumes before an item has been entered into the subtotalizer. Depression of the total key 210 is prevented by a latch 220 (Fig. 9) secured to a shaft 221 and having a hook 222. The hook 222 engages the yoke 216 and thereby prevents movement of the arm 212 and depression of the total key 210. Upon depression of the consecutive check feed key 88, it will be remembered that the link 102 (Fig. 9) is moved in a direction toward the front of the machine. Pivotally connected to the link 102 near its center is an arm 223 secured to the shaft 221. It will also be remembered that the link 102 is latched in its forward position by one arm of the bell crank 104. Therefore, after the key 88 has been depressed, the link 102 will be held in its forward position, which will hold the hook 222 of the latch 220 down out of the path of the yoke 216, thus unlocking the total key 210. The hook 222 will remain disengaged from the yoke 216 until after a total printing operation, during which operation the bell crank 104 will be disengaged from the stud 103, as will hereinafter be described. This will permit the hook 222 to engage the yoke 216 and thus lock the total key 210 until another item has been entered into the subtotalizer.

Total printing operation

The subtotalizer is provided with the indicating wheels 70 (Figs. 1 and 3) to enable the operator to read the total amount of the items entered. When it is desired to print this total, the operator will manually depress keys 30 corresponding with the amount indicated by the wheels 70 in the same manner as when entering items. He will then depress the total check key 210 and release the machine by depressing the consecutive check feed key 88. The total check key 210 (Figs. 1 and 14) will control mechanism for turning the subtotalizer to zero and it will prevent the mechanism for entering items in the subtotalizer from becoming effective.

Subtotalizer turn-to-zero mechanism

The mechanism for turning the subtotalizer to zero will now be described. Mounted in the frame 31 (Fig. 14) for the total check key 210 is a stud 230 which is pivoted a lever 231. The rear end of the lever 231 is bifurcated to embrace a stud 232 mounted on a lever 233 pivoted on a stud 234, also mounted in the frame 31. The lever 233 carries at its upper end a wide pinion 235 adapted to engage two gears 236 and 237. The pin 213 of the total key 210 will contact the lever 231 and, through the stud 232, will rock the lever 233 in clockwise direction to engage the pinion 235 with the above mentioned gears 236 and 237. This will couple the gears 236 and 237 so that any movement of the gear 237 will be transmitted to the gear 236. The gear 237 is rotated as follows: Secured to the main shaft 38 is a mutilated gear 240 to which is secured a locking disk 241 having notches 242. Counter-clockwise rotation of the mutilated gear 240 causes it to mesh with a gear 243. The gear 243 has secured to its side a locking plate 244. When the gear 243 and plate 244 are rotated by the mutilated gear 240, teeth 245 on the plate will enter the notches 242 in the locking disk 241, thereby permitting the rotation of the gear 243. The gear 243 meshes with a gear 246 secured to a gear 247 which meshes with the gear 237. The ratio of this train of gears is such that one complete rotation of the main shaft 38 will turn the gear 237 one complete rotation. The main shaft 38 gets a complete rotation during every operation of the machine, but in item entering operations this train of gears will not perform any function, and simply turns idly.

The lever 233 and pinion 235 are held in their adjusted positions with the pinion in mesh with gears 236 and 237 by a cam arm 289 mounted on the shaft 34. During the operation of the machine, a curved rib 238 on the arm 289 will move under and behind a stud 239 carried by the lever 233 and prevent the disengagement of the pinion 235 from the gears 236 and 237.

When the total key 210 is depressed, and the coupling pinion 235 is engaged with the gears 236 and 237, the gear 236 will be given a complete clockwise movement, which in turn will rotate a gear 250 fast on the totalizer shaft 251, and meshing with the gear 236, in counter-clockwise direction (Fig. 14) one complete rotation.

The totalizer shaft 251 has a longitudinally extending groove 252 (Figs. 3 and 12) adapted to engage spring-actuated pawls 253 secured to the sides of the several gears 68 mounted on the indicators 70. Upon rotation of the shaft 251 all of the indicators 70 will be turned in counter-clockwise direction (Fig. 3).

The pawl 253 for the units indicator wheel 70 is so mounted on the gear 68 (Fig. 12) that the complete turn of the shaft 251 will set this indicator wheel to "zero." The pawls 253 for the higher order wheels 70 are so mounted that the shaft 251 will turn them to "nine." The purpose of this arrangement is to permit the use of the regular transfer mechanism in the subtotalizer as is later described in detail. By this arrangement, when the units wheel goes from "9" to "0", the transfer mechanism will be tripped, and, since the higher order wheels are setting at "9" when the transfer becomes effective, the transfer will be carried across to the highest totalizer wheel, and thereby return all these wheels to zero.

Transfer mechanism

The transfer mechanism above referred to will now be described. A transfer cam 260 (Fig. 11) is secured to the main shaft 38, for each of the tens and higher order wheels 70. The timing of the transfer cams 260 is such that the cam for the tens wheel will actuate its transfer mechanism before the cam for the hundreds wheel actuates its mechanism, and the hundreds wheel before the thousands, and so on to the highest order.

A pitman 261 carries a roller 262 at one end engaging a cam race in the transfer cam. The forward end of the pitman 261 is bifurcated and embraces a stud 263 secured to a rocker 264 pivoted on a rod 265. The rocker 264 carries a pawl 266 pivoted thereon and having a nose 267 at one end. The pawl 266 is held in the position shown by a spring-pressed plunger 268. Secured to the lower order gear 67 meshing with its totalizer gear 68 is a single-toothed member or trip cam 270. Upon rotation of the transfer cam 260 the pitman 261 is rocked to the right (Fig. 11), which in turn swings the rocker 264 about its pivot 265 and moves the nose 267 into the path of the tooth of the trip cam 270. When a lower order wheel passes from "9" to "0", the tooth of member 270 will come into contact with the projection 267 of pawl 266. If the tooth of the trip cam 270 lies in the path of the nose 267, the contact of the nose 267 with the tooth on the trip cam 270 will rock the pawl 266 in counter-clockwise direction to engage a tooth 275 thereon with a ratchet 276 secured to the gear 67 associated with the next higher totalizer wheel 70. Upon the continued rotation of the transfer cam 260, the pitman 261 will be returned towards the left and will turn the rocker 264 in clockwise direction. At this time if the tooth 275 is in engagement with its ratchet 276, it will turn the ratchet and the gear 67 of the next higher wheel, and add "one" to the higher order wheel.

If the pawls 253 (Fig. 12) were located on all of the counter gears 68 so as to turn them all to zero, it would be necessary to cripple the transfer mechanism just described during turn-to-zero operations. The main shaft 38 receives a complete rotation for every cycle of operation of the machine, whether it be for item entering or for totalizing. The arrangement of the pawls 253 above described overcomes the necessity of additional mechanism for crippling the transfer mechanism during turn-to-zero operations.

Classification totalizer disabling mechanism

As before mentioned, it is necessary to throw off the mechanism for engaging the classification totalizers 110 with the actuators 111 (Fig. 5) during total-taking operations. This mechanism will now be described. It will be remembered that during total-taking operations, it is necessary to depress the total key 210 (Fig. 14). It will also be remembered that when the total key 210 is depressed, the arm 212 is rocked in clockwise direction which, through the link 214, rocks the arm 215 of the bail 216 in clockwise direction. The arm 215 has a rearwardly projecting hook 280 (Figs. 13 and 14) adapted to engage a pin on a crank 281 (Fig. 13) secured to a stub shaft 282 (Fig. 1, 5 and 13). Also secured to the stub shaft 282 is an arm 283 pivotally connected to a link 284 (Fig. 5) engaging a stud 279 on the slide 131. When the total key 210 is pressed, and the arm 215 is rocked in clockwise direction (Figs. 13 and 14), the arm 283 and the link 284 (Fig. 5) will be lowered, thereby permitting the slide 131 which carries the roller 130 to drop. When the cam 125 is then operated, the cam rib 129 thereof will pass over the top of the roller 130 and hold the slide 131 in its lower position. It can thus be seen that the reel frame 112 carrying the classification totalizers 110 will not be lifted to engage such totalizers with the actuating segments 111 during a total printing operation.

Total printing mechanism

The mechanism for selecting the long platen 136 for printing totals will now be described. It will be remembered that the shorter platen 135 is normally set to print items. The mechanism for shifting the long platen is as follows: When the total key 210 (Fig. 17) is depressed, the laterally projecting pin 213 thereon will engage the broadened front end of a slide 285, the lower portion of which embraces and is slidably supported by the shaft 34, and will move the slide to cause the rear end 286 thereof to contact a flange 287 on a pitman 288, the forward end of which is bifurcated to also embrace the shaft 34. The free end of the arm 289 secured to the shaft 34 is beveled, as at 290, to engage a block 291 riveted to the pitman 285. It will be remembered that during the operation of the machine, the shaft 34 is rocked first counter-clockwise and then clockwise, and since the arm 289 is secured thereto, this arm will also rock with the shaft 34. The movement of the slide 285 upon the depression of a key 210 is sufficient to position the block 291 in the path of the beveled edge 290 of the arm 289. Upon engagement of the beveled edge 290 with the block 291, the slide 285 will be given an additional movement, and if the rear end 286 thereof contacts the flange 287 of a pitman 288, this pitman will also be moved. The rear end of the pitman 288 is pivotally secured to an arm 295 (Fig. 14) pinned to a shaft 296 having also secured thereto an arm 297 (Fig. 16). A link 298 connects the arm 297 with an arm 299 on the lower paper feed roll shaft 300. The arm 299 has mounted upon it a stud 301 projecting into a slot in one end of a link 302 which is secured at its other end to the guide arm 161 for the printing hammer 152.

From the above it can be seen that when the total key 210 is depressed, and the machine is operated, the guide arm 161 will be rocked towards the front of the machine. The slot 162 in the arm will then be positioned so that the stud 160 of the printing hammer 152 will guide the longer platen 136 to engage the printing wheels.

Consecutive numbering device

Mechanism is provided for numbering the consecutive transactions. This device must be inactive during multiple item entering operations, and active when printing totals of a multiple item transaction, and when entering and printing a single item transaction. This mechanism is shown in Fig. 8 in the position which it assumes during multiple item entering operations. Meshing with the idler gear 47 is a gear 305 pinned to a shaft 306. Also secured to the shaft 306 is a cam 307 adapted to engage a roller 308 mounted on a spring-actuated arm 309 loosely mounted on a stud 310. Loosely mounted on the stud 310 is an arm 311 bifurcated to embrace a stud 312 mounted in one arm of a bail 313 loosely mounted on a type carrier rod 314. The bail 313 carries a differentially tined member 315 adapted to engage ratchet wheels 316 secured to the side of numbering type wheels 317.

Pivoted on the arm 309 is a consecutive member actuator coupling link 325 slotted as at 326 to embrace a stud on one arm of a lever 328 pivoted on a stud 329 secured to the printer frame 139. The opposite arm of the lever 328 has a bifurcated portion engaging a stud 330 (Figs. 8 and 16) secured to a bell crank 331 pivoted on a stud 332 mounted in the printer frame 139. A short link 333 (Fig. 16) connects the bell crank 331 and the printing hammer guide arm 161. When the guide arm 161 (Fig. 8) is rocked, as before described, for positioning the longer platen 136 for operation, the bell crank 331 and lever 328 will move the coupling link 325 in counter-clockwise direction with its upper end as the pivot, far enough to engage a shoulder 340 thereof with a flattened stud 341 on the arm 311. Upon rotation of the shaft 306 in single item transactions and in total taking operations, the cam 307 will rock the arm 309 clockwise, to move the coupling link 325 to cause a clockwise movement of the arm 311 through the engagement of the shoulder 340 with the stud 341. This movement of the arm 311 will move the bail 313 in counter-clockwise direction, and since the pawl 315 is in engagement with the ratchet 316 on the consecutive number type wheel 317, it will advance the wheel one step. After the pawl 315 has added "one" to the consecutive number type wheel 317, the cam 307 passes the roller on the arm 309 and a spring 342 (Fig. 8) restores the arm 309 to its normal position, and a spring 343 restores the bail 313 and arm 311 to their normal positions. A spring 344 attached to the bell crank 331 is permitted to rock the lever 328 counter-clockwise which rocks the actuator coupling link 325 clockwise, with its upper end as the pivot, to disengage the shoulder 340 from the stud 341 of the arm 311. The spring 344 functions after all operated keys have been released, and just before the end of the operation of the machine. It will be recalled that the cam arm 289 (Figs. 14 and 17) is rocked first counterclockwise then clockwise to normal position, and when the total key 210 has been depressed, the cam arm 289, through the block 291 and slide 285, moves the pitman 288 to the right and maintains it in such position against the tension of a spring 346 attached to said pitman. It will also be recalled that the shaft 296 and arm 297 (Fig. 16) are rocked clockwise by the pitman, and move the links 298 and 302 and rock the bell crank 331, thus stretching the spring 344. Therefore, the spring 344 cannot function to return the bell crank 331, lever 328 and coupling link 325 to normal positions until the cam arm 289 releases the block 291 to allow the spring 346 to restore the pitman 288, shaft 296 and arm 297 to their normal positions.

When the mechanism is in the position as shown in Fig. 8, as in multiple item transactions, and the cam 307 rocks the arm 309, it will have no effect on the bail 313, because the shoulder 340 of the coupling link 325 will not engage the stud 341 when the arm 309 is rocked clockwise, therefore, the arm 311 will not be moved and nothing will be added on the consecutive number type wheels. This happens during multiple item entering operations only, at which time the short platen 135 is in operative relation with the printing wheels, and since the platen is not long enough to engage the consecutive number wheels, no consecutive number will be printed on the check.

Duplicate check feed

During total printing operations, the amount is printed twice. Therefore, the check must first be fed a certain distance, then it must come to rest long enough to take one impression, and then it must be fed to space the check for the second impression. The mechanism for accomplishing this intermittent feed during a single total printing will now be described. It will be remembered that when the link 298 (Figs. 15 and 16) is moved forward during total-taking operations, this movement is transmitted to the lower paper feed roll shaft 300 by the arm 299. The paper feed roll shaft 300 carries the eccentrics 172 positioned on the inside of the lower paper feed roller 171. Upon rocking movement of the eccentrics 172, the driven paper feed roller 171 is raised high enough to permit the feed rails on the upper paper feed roller 170 to feed the paper. A long feed rail 345 is provided for the purpose of feeding the paper far enough to print the first or lowermost total shown in Fig. 18. A short feed rail 346 is provided to feed the paper far enough to position the check on the printing line for the second total impression.

During the total printing operation, the before mentioned lifting roller 180 (Fig. 10) is rocked upwardly into contact with the driven paper feed roller 171, by the stud 175 which strikes the lug 176 on the bell crank lever 177 in the same manner as during item entering operations. However, this engagement of the lifting roller 180, with the paper feed roller 171 has no effect on the feeding of the check strip at this time, because the paper feed roller 171 has already been elevated into its feeding position by the eccentric 172. The feed rails 345 and 346 determine the length of feed of the check paper during total taking operations, regardless of the position of the lifting roller 180. As before mentioned, the lifting roller 180 is for controlling the check feeding mechanism to feed the paper from the knife to the printing position and for spacing the multiple items. During these operations, the eccentrics 172 are in their normal positions, thus permitting the feed mechanism to be controlled by the lifting roller 180.

Perforating mechanism

Figure 19:
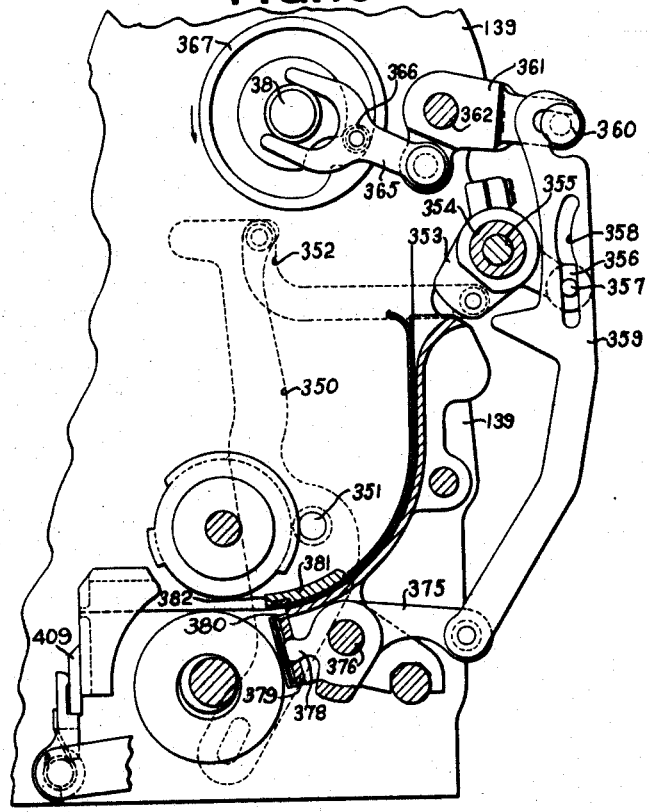
Fig. 19 is a detail view showing the mechanism for operating the perforator.
Figure 20:
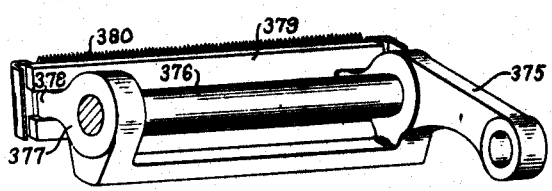
Fig. 20 is a detail perspective view of the perforator and the frame upon which it is carried.

A mechanism is provided for perforating the check between the two printed totals. This mechanism is normally in an inactive position, and the depression of a total key will render this mechanism active during the total-taking operation. It will be remembered that the operation of the machine subsequent to depressing the total key 210 rocks the link 298 (Fig. 16) towards the front of the machine. This link 298 is also attached to one arm of a lever 350 (Figs. 16 and 19) pivoted on a stud 351 on the printer frame 139. A link 352 connects the lever 350 to a bell crank 353 pivoted on a hub 354 surrounding a shaft 355. The bell crank 353 has a rearwardly projecting arm 356 carrying a stud 357 projecting into a cam slot 358 in a link 359. The link 359 has a hook near its upper end to engage a stud 360 mounted on an elbow lever 361 pivoted on a stud 362 mounted on the printer frame 139. The elbow lever 361 has a downwardly projecting arm on which is pivotally mounted a pitman 365 carrying an anti-friction roller 366 engaging a cam race in a cam 367. The cam 367 is secured to the main shaft 38. The lower end of the link 359 is pivotally connected to an arm 375 (Figs. 19 and 20) mounted on a shaft 376. The arm 375 is yoked to a small arm 377. The arms 375 and 377 have knobs 378 projecting into slots in a bar 379 to which is secured a perforator knife 380. At the beginning of the rotation of the cam 367, the pitman 365 is moved towards the left (Fig. 19) and will rock the elbow lever 361 in a clockwise direction. A bar 381, having a groove 382, is located adjacent the perforator. This bar 381 forms a backing for the paper so that the perforator knife 380 can cut through the paper. If the hook on link 359 is engaged with the stud 360, the link 359 and arm 375 will operate the perforator knife 380 and perforate the check. If, however, the hook of the link 359 has not been engaged with the stud 360, the arm 361 will simply make an idle movement. From the above description it can be seen that, during item-entering operations, the perforator will not function, due to the fact that the link 298 has not rocked the lever 350, and therefore, the link 359 will remain disengaged from the stud 360. However, during total printing operations the lever 350 is rocked, and therefore, the link 359 will be rocked to engage the stud 360, and during this operation the perforator will function.

In machines of this type it has heretofore been customary to perforate the check after the first total has been printed, and then print the second total after the perforation has been completed. However, in the present machine, it is necessary to perforate the check at the beginning of the total printing operation, in order to properly locate the perforation in the check, because the perforator is located so far from the printing line. Thus the paper is perforated before it receives the feeding movement which brings it into position for taking the first total impression.

The lever 350 is held in its shifted position by a disk 382 (Fig. 16) having a mutilated flange 384 adapted to engage a roller 383 mounted on the lever 350. When the lever is shifted, the roller 383 engages the inner side of the flange during the operation of the machine. This will hold the various mechanisms which are attached to the lever 350 in their shifted positions.

Knife operating mechanism

The mechanism for severing the printed check is normally inactive and is set for operation when the total key 210 is depressed. It will be remembered that when this key is depressed, the slide 285 (Fig. 17) is brought into a position so that when the machine is operated and the shaft 34 is rocked, the cam arm 289 will shift the pitman 288 and rock the arm 295 and the shaft 296. Secured to the shaft 296 is an arm 385 (Figs. 14 and 17) connected to an arm 386 by means of a link 387. The arm 386 is pinned to a shaft 388, to which is also secured an arm 389 having a slot 390. A stud 391 mounted in a bell crank 392 pivoted on a stud 393 projects into the slot 390 in the arm 389. The forwardly projecting arm of the bell crank 392 has mounted thereon a roller 395. A cam 400, secured to the sleeve 145, is given a complete rotation during every operation of the machine. When the mechanism is in the position shown in Fig. 17, the cam 400 merely makes an idle operation, this mechanism being shown in the position assumed when entering multiple items in the machine. The cam disk 400 is provided with a cam race formed in one side face thereof, a portion of the outer wall of which race is broken away at a point opposite the roller 395 on the bell crank 392, when the parts are at rest. Upon operating the machine subsequent to depressing the total key 210, the roller 395 will be rocked into engagement with the cam race in the cam 400. Since the cam 400 starts its movement before the roller 395 is entirely engaged with the cam, the cam race is provided with an opening wide enough to permit this overlap of movement. The engagement of the roller 395 with the cam race is effected by means of the bell crank lever 392, the arm 389, shaft 388, arm 386, link 387, and arms 385 and 295, as above described. The initial movement of the bell crank lever 392 will be sufficient to engage the edge 401 thereof with a stud 402 of an arm 403 (see also Fig. 22). The arm 403 is secured to a bail 404 which carries an arm 405. The arms 403 and 405 carry a rod 406 on which is pivoted a holder 407. The holder 407 is spring-pressed in a clockwise direction by a pair of coil springs 408 each of which is wound around the rod 406, each having one end thereof secured to a collar on the rod 406 and their other ends bearing against the holder 407. A knife blade 409 is carried in the holder 407 and bears against a knife bracket 410 carried by the frame 139 and the front printer frame (not shown).

Near the end of the rotation of the cam 400, the bell crank lever 392 is given an additional rocking movement by the cam race in the cam 400. Since the surface 401 of the bell crank lever 392 engages the stud 402, it will rock the arms 403 and 405 and thereby move the knife blade 409 up far enough to sever the check.

Check ejector mechanism

Mechanism is provided to eject the check from the machine after the knife has severed it from the strip. This mechanism is old and well known in the art and a detailed description thereof can be had by referring to Letters Patent of the United States, No. 1,198,492, issued to Edward J. Von Pein on September 19, 1916. A brief description will be given herein. This mechanism is inactive during multiple item entering operations. When printing is done on a slip, this mechanism is used for feeding the slip between the duplicate printing operations. However, during total-taking operations, and when entering a single item transaction, the check ejector operates as a means for rapidly ejecting the check from the machine.

The check ejector mechanism, as it operates during total-taking operations, will now be described. A cam 415 (Fig. 8) is secured to the shaft 126. A roller 416, mounted on a pitman 417, cooperates with a cam race in the cam 415. The lower end of the pitman is pivotally mounted on an arm 418 pivoted on a stud 419 carried by the printer frame 139. The arm 418 has mounted thereon a stud 420 adapted to cooperate with a cam arm 421 of a bell crank 422 loosely mounted on the shaft 310. A segment 428 (Figs. 6 and 8) is adjustably secured to the bell crank 422 and meshes with a gear 429 secured to a shaft 430. Also secured to the shaft 430 is an ejecting roller 431. Mounted in the printer frame 139 above the ejecting roller 431 is a stud 435 which carries a co-acting ejecting roller 436 adapted to be engaged by the ejecting roller 431.

The mechanism for engaging the ejecting roller 431 with its co-acting roller 436 will now be described. Mounted on the shaft 306 (Fig. 8) is a cam 440 which is adapted to engage a stud 441 mounted on an arm 442 secured to a short shaft 443 carried by a bracket in the printer frame 139. Also secured to the short shaft 443 is an arm 444 (Fig. 6) which carries a spring 445 near its right hand end. The spring 445 is held between the arm 444 and an arm 446 forming part of a yoke 448 loosely mounted on the stud 443 and carrying the shaft 430. A lug 447 projecting from the side of the arm 446 is held in engagement with the arm 444 by the spring 445. Upon rotation of the cam 440, the arm 442 will be rocked counter-clockwise (Fig. 8) and through the arm 444 and spring 445 will rock the yoke 448 counter-clockwise to raise the shaft 430. Since the ejecting roller 431 is mounted on the shaft 430, it will thereby be raised to engage the co-acting roller 436.

After the ejecting roller 431 has been engaged with the co-acting roller 436, it is given a quick rotation as follows: Near the end of the rotation of the cam 415, the pitman 417 will be moved towards the bottom of the machine, thereby rocking the arm 418 counter-clockwise and the stud 420 on the arm 418 will therefore, rock away from the cam arm 421 of the bell crank 422 and permit the spring 424 to rock the bell crank 422 in clockwise direction about the stud 310. This will rock the segment 428 (Fig. 6) in counter-clockwise direction, which in turn will rotate the ejecting roller 431 through the gear 429 and shaft 430. This initial movement of the ejecting roller 431 takes place just before its contact with the ejecting roller 436 (Fig. 8). After the ejecting rollers have been engaged with the check between them, the arm 418 will be rocked in clockwise direction by the cam 415 and will thereby engage the stud 420 with the cam arm 421 and reverse the movement of the ejecting roller 431. This movement of the ejecting roller 431 will eject a check from the machine.

*Subtotalizer disabling mechanism*

The subtotalizer coupling pinions 65 (Fig. 4) must not function to couple the pairs of gears 61 and 66 during total printing operations, that is, during the time in which the subtotalizer wheels 70 are being turned to zero. This mechanism is under the control of the total key 210. The mechanism for shifting the pinions 65 into mesh with the gears 66 and 67 is effective during adding operations, as shown in Fig. 4. A cam 450, pinned to the main shaft 38, is adapted to move a pitman 451 which normally engages a stud 452 on an arm 453 secured to a shaft 454. Also secured to the shaft 454 for each digit wheel of the subtotalizer 70, is an arm 455. The various arms 455 each carry one of the coupling pinions 65. Therefore, when the cam 450 is rotated, the coupling pinions 65 will move to mesh with and couple the pairs of gears 61 and 66, as before mentioned. This condition exists during item entering operations. However, during total printing operations the coupling mechanism must be disabled. This disabling mechanism is under the control of the total key 210 (Fig. 14). When the key 210 is depressed, the pin 213 will engage an arm 460, similar to the arm 212, but loosely mounted on the shaft 211. The arm 460 is connected to an arm 461 by a link 462. The arm 461 is secured to a shaft 463 to which is also secured an arm 464 carrying a stud 465. Pinned to the shaft 34 is a segment 466 similar to the drivers 33 for the amount differentials. The segment 466 has secured thereto a curved rib 467 provided with a camming surface 468. It will be remembered that the shaft 34 receives a rocking movement during each cycle of the machine.

When the total key 210 is depressed, the arm 460 will rock the shaft 463 and position the stud 465 in the path of the camming surface 468 on the rib 467. The depression of the total key 210 will so position the stud 465 that, during an operation of the machine, the segment 466 will cam the shaft 463 in a clockwise direction. Secured to the shaft 463 (Fig. 4) is an arm 470. The depression of the total key 210 will rock the shaft 463 far enough to engage the end 471 of the arm 470 with a lug 472 on an arm 473 loosely mounted on the shaft 463. The arm 473 is connected to the pitman 451 by means of a link 474. From this it can be seen that when the driving segment 466 gives the shaft 463 its additional movement, the arm 470 will rock the arm 473, which in turn will disengage the pitman 451 from the stud 452 on the arm 453. Therefore, when the cam 450 moves the pitman 451, it will slide over the stud 452 and will, therefore, not engage the coupling pinions 65 with the pairs of gears 61 and 66.

*Mechanism for unlocking the check and slip keys*

When the consecutive check key 88 is depressed for entering a multiple item transaction into the subtotalizer, it will be remembered that the check and slip keys 87 and 89 are locked against depression. During total-taking operations these keys are again unlocked so that the machine may be released by either of these two keys for subsequent operations. It will be remembered that the latching bell crank 104 (Fig. 9) is rocked behind the flattened stud 103 on the link 102 to prevent depression of the check and slip keys 87 and 89, respectively, due to the fact that the high faces 93 of the detent 91 are held in engagement with the studs 86 of said keys. It will also be remembered that during total-printing operations, the shaft 388 is rocked counter-clockwise by the cam arm 289 and the pitman 288 (Fig. 14). Secured to the shaft 388 is a bail 410 (Figs. 9 and 14), one arm 411 of which is in the path of a stud 412 mounted in one arm of the bell crank 104. Upon counter-clockwise movement of the shaft 388, the arm 411 of the bail 410 will contact the stud 412 and thereby rock said bell crank counter-clockwise and disengage it from the stud 103 of the link 102. The spring 413 will thereupon return the mechanism to its normal position, as shown in Fig. 9. This will shift the high faces 93 from the paths of the pins 86 and thereby permit the depression of the keys 87 and 89 on subsequent operations.

The movement of the link 102, as just described, will also restore the latch 220 and arm 223 to their normal positions, whereby the hook 222 of the latch 220 will again engage the yoke 216 and thereby prevent depression of the total key 210 until an item has again been entered in the subtotalizer.

Single item transactions

When a single item transaction is entered in the machine, the check key 87 is pressed to release the machine. This key will control the printing, perforating, severing, consecutive numbering, and the ejector mechanisms in a manner similar to that in which they were controlled by the depression of the total key 210, the only difference being in the method of moving the slide 285 (Fig. 17), so that its rear end 286 will engage the flange 287 on the pitman 288. This is accomplished in the following manner: A stud 475 (Fig. 17) is mounted on the stem of the check key 87 and is engaged by a bifurcated end of an arm 476 pinned to the shaft 211. Also secured to the shaft 211 is an arm 477 having mounted thereon a stud 478 projecting into a triangularly shaped aperture 479 in the slide 285. From this it can be seen that when the check key 87 is depressed, the arm 476 will rock the shaft 211 and the arm 477, which will move the slide 285 to contact its rear end 286 with the flange 287 on the pitman 288 in the same manner as when the total key 210 is depressed. This movement will also place the block 291 in the path of the beveled edge 290 of the curved arm 289. Therefore, when the shaft 34 is given its rocking movement, the pitman 288 will be moved in a manner identical with that described when considering the total printing operation.

Amounts will be entered into the classification totalizers in the same manner as multiple items, because the mechanism for disabling the classification totalizer engaging and disengaging mechanism will be unaffected by the check key 87.

Subtotalizer throwout mechanism

When entering single item transactions, it is necessary to disable the subtotalizer 70. This is done in a manner similar to that when throwing the subtotalizer mechanism out of operation during a total printing operation. The only difference in the two methods is in the way the stud 465 (Fig. 4) is rocked into engagement with the cam surface 468 of the curved rib 467. This is accomplished by the check key 87 in the following manner: A stud 485 is mounted on the stem of the check key 87 to contact an arm 486 pinned to a shaft 484. Also pinned to the shaft 484 is an arm 487 which is connected to an arm 488 by means of a link 489. The arm 488 is pinned to the shaft 463. It will be remembered that the arms 464 and 470 are also pinned to the shaft 463. From this it can be seen that when the check key 87 is depressed, the pin 465 will be moved into the path of the camming surface 468 of the rib 467. The pitman 451 will, therefore, be disengaged from the stud 452 in the same manner in which it is accomplished during total printing operations.

Slip printing operation

When printing on a slip, it is desired to disable the knife, perforator, and check feed mechanisms. However, the printing mechanism and consecutive number printing device must be operated in order that the proper record may be made on the slip. The subtotalizer 70 is rendered ineffective in a manner similar to that for entering single item transactions. The means for disabling the subtotalizer 70 under control of the slip key 89 is as follows: A link 495 (Fig. 4) is pivoted at one end to the stem of the slip key 89 and is forked at its opposite end to embrace a stud 496 mounted on the before-mentioned arm 486. From this it can be seen that when the slip key 89 is depressed, the link 495 will rock the arm 486 in a manner similar to that in which it was rocked by the check key 87. This in turn, will move the stud 465 into the path of the camming surface 468 of the curved rib 467 and therefore, upon operation of the machine, the pitman 451 will be disengaged from the stud 452.

Printing hammer control

It is desired to adjust the printing hammer 152 (Figs. 8 and 21) when printing on a slip in order that the long platen 136 will be shifted into the operative position. The mechanism for shifting this platen during total printing and single item transaction operations is connected to the mechanism for throwing out the knife and perforator. However, when printing on a slip, it is desired to have these mechanisms inactive, and therefore, another means is provided to shift the hammer 152, which is as follows: Mounted on the slip key 89 (Figs. 1 and 9) is a stud 500. A spring-actuated arm 501 is held in contact with the stud 500. The arm 501 is pinned to a shaft 502 to which is also secured an arm 503 adapted to contact the stud 330 (Figs. 8, 9 and 10) mounted on the bell crank 331. It will be remembered that the bell crank 331 (Fig. 16) is connected to the guide and shifting arm 161 by a short link 333. From this it can be seen that when the slip key 89 is depressed, the arm 503 will press downwardly upon the stud 330 and thereby rock the arm 161 counter-clockwise, (Fig. 16), so that during the subsequent operation of the machine the long platen 136 will lie in printing position to contact the type wheels.

It will be remembered that the consecutive numbering device is also controlled by the rocking of the bell crank 331 (Fig. 16). It can, therefore, be seen that the slip key 89 will control the printing hammer and the consecutive numbering device in the same manner as above described when considering the total printing operation.

Slip feed mechanism

The slip is fed by the check ejector mechanism. However, this mechanism is controlled so that instead of giving the slip a rapid feed it will give it a slow feed, to space the slip for a second impression. A detailed description of this mechanism can be had by referring to the above mentioned Von Pein Patent, No. 1,198,492. A brief description, however, will now be given.

The means for engaging the ejecting and slip feed roller 431 (Fig. 8) with the co-acting roller 436 is identical with that described for the check ejector mechanism. The ejecting and slip feed roller 431 is operated by the cam 307, described in connection with the consecutive numbering mechanism, instead of by the arm 418 described in connection with the check ejector mechanism. The timing of the cam 307 is such that it will engage a roller 510 on the bell crank 422 after said roller 510 has been moved into the path of said cam 307 by the rocking of the bell crank 422 by the spring 424, when released by the disengagement of the stud 420 from the arm 421 of the bell crank 422, and will rock the bell crank 422 counter-clockwise before the stud 420 again contacts the cam arm 421 of the bell crank. This will impart a slow rotary movement to the ejecting and slip feeding roller 431 through the toothed segment 428 and gear 429, as heretofore explained.

The cam 307 is shifted out of the plane of the roller 510 during total printing and single item transactions by the following mechanism: It will be remembered that the lever 350 (Figs. 8 and 16) is rocked in a clockwise direction during either of these two types of operations. The lever 350 is connected to an arm 511 (Fig. 8), by a link 512. The arm 511 carries a stud 513 projecting into a cam groove 514 in a bracket 515. The arm 511 and the cam 307 are secured to the shaft 306, which is slidably mounted in a bracket 519 carried by the frame 139. This shifting mechanism is old and well known, and is shown in the above mentioned Von Pein Patent, No. 1,198,492.

During item entering transactions, it is desired to throw off the check ejector mechanism. It will be remembered that the cam 440 (Fig. 8) on shaft 306 is given a complete rotation during every cycle of the machine, no matter what type of transaction is being entered. It is during the multiple item transaction that a special mechanism is required to prevent the ejecting and slip feed roller 431 from contacting with the co-acting roller 436. This is done in the following manner: Secured to the arm 446 (Fig. 8) is a downwardly projecting leg 520. Secured to the bell crank 331 is an angle clip 521. When the bell crank 331 is in its normal position, as shown, and the arm 446 is being raised by the arm 444 and spring 445, as previously described, the downwardly extending leg 520 will contact the angle clip 521 and thereby arrest farther movement of the arm 446. Continued movement of the arm 444 will then compress the spring 445. This will prevent the ejecting and slip feed roller 431 from contacting the co-acting feed roller 436 during multiple item transactions, because it is during this time that the bell crank 331 is in the position shown.

The short feed mechanism for the paper when entering multiple item transactions must be disabled during total printing and during single item transaction operations. It will be remembered that during the entry of multiple item transactions, the lifting roller 180 (Fig. 10) is rocked into contact with the feed roller 171, which carries the feed roller 171 into contact with the feed roller 170. The lifting roller 180 is carried on the arm 179, which is secured to the shaft 178. Also secured to the shaft 178 is an arm 525. The angle clip 521 has a lateral projection 526 which lies in the plane of the arm 525. Therefore, when the bell crank 331 is rocked, the projection 526 will engage the end of the arm 525 and thereby prevent the lifting roller 180 from contacting the feed roller 171.

Operation

A brief description of the operation of the machine will now be given. The operation during a multiple item transaction will be considered first. The operator will set the amount on the amount keyboard 30 and release the machine by depressing the consecutive check key 88. The mechanism will then be controlled so that the amount will be entered into the subtotalizer 70, and also into the classification totalizer 110 selected by the totalizer-selecting lever 118. Any number of items can be entered, the total of which will be indicated on the subtotalizer. The printing mechanism and the feeding mechanism are so controlled that before the first item is printed, the check is given a long feed to feed the end of the check into printing position, and after the first impression is made, the check is given a short feed to properly space the next item. Depression of the consecutive check key 88 will lock the check and slip keys 87 and 89 and will prevent their being depressed until after the total of the amount on the subtotalizer 70 has been printed. This will also unlock the total check key 210, which is normally not depressible. After the various items have been entered in the subtotalizer 70, the operator will set the amount indicated therein on the keyboard 30, depress the total key 210, and release the machine by depressing the consecutive check key 88. Upon operating the machine, the subtotalizer 70, will be automatically turned to zero and the classification totalizers 110 will be disabled so that this amount will not be added therein. The printing mechanism will be so controlled that the amount of the total, the consecutive number and the date will be printed on the check in duplicate, and the check will be perforated at a point between these two printed amounts. The feeding mechanism will be controlled so that a long feed will be given to the check. The knife is so controlled that it will become effective and will sever the check, after which the ejector will eject it from the machine.

During single item transactions, the operator will select the classification totalizer 110 by means of the lever 118, set up the amount on the key board, and release the machine by depressing the check key 87. This will so control the machine that the amount may be entered in the classification totalizer, but not in the subtotalizer 70. The printing mechanism will be controlled so that the check will be given a long feed and the platen 136 will effect the printing of the amount, the consecutive number and the date on the check in duplicate. The check will be perforated between the printed amounts and the knife will sever the check. After the check has been severed, the check ejector will eject the check from the machine.

When it is desired to print on the sales slip, the classification totalizer 110 is selected by the lever 118, the amount is set up on the keyboard, and the machine released by depressing the slip key 89. During this operation, the amount will be added into the classification totalizer, but the subtotalizer 70 will be disabled. The knife and perforator mechanism will also be left inactive. The check ejector mechanism is so controlled that it will feed the slip far enough to print the amount of the transaction thereon in duplicate. The platen 136 will be controlled so that the amount entered, the consecutive number and the date will be printed on the slip.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a manipulative device for controlling the entry of successive items in a subtotalizer, a manipulative device for controlling the machine for printing the total of the items, and means for preventing depression of the second-mentioned manipulative device until after the machine has been operated subsequent to operating the first-mentioned manipulative device.

2. In a machine of the class described, the combination of a manipulative device for entering successive items in a subtotalizer, a manipulative device for printing the total of the items, means for preventing depression of the second-mentioned manipulative device until after the machine has been operated subsequent to depressing the first-mentioned manipulative device, and means for automatically locking the second-mentioned manipulative device after a total printing operation.

3. In a machine of the class described, the combination of means for printing items, means for printing the total of the items, and means to prevent operation of the total printing means prior to an item printing operation.

4. In a machine of the class described, the combination of means for printing a plurality of items, means for printing a total of the items, means for printing and issuing a single item check, means to prevent operation of the total printing means prior to an item printing operation, and means to prevent printing and issuing a single item check until after the total of the multiple items has been printed.

5. In a machine of the class described, the combination of a key for entering items, a key for printing the totals of the items, a detent operable by the first-mentioned key, a link connected to the detent, a rockable shaft, an arm pinned to said shaft and connected to said link, another arm pinned to said shaft, a link secured to the last-mentioned arm, a bell crank one arm of which has a hook portion, an arm operated by the second-mentioned key, a link pivoted to the said arm, and a yoked member rockable by the last-mentioned arm and link normally locked against movement by the hook portion of the said bell crank.

6. In a machine of the class described, the combination of means for printing a plurality of items on a check, means for printing the total of the items on the check, a yoked member rockable by the second-mentioned means, and a latch under control of the first-mentioned means for preventing the operation of the yoked member.

7. In a machine of the class described, the combination of means for printing a plurality of items on a check, means for printing the total of the items on the check, a yoked member rockable by the second-mentioned means, a latch under control of the first-mentioned means for preventing the operation of the yoked member, and a bell crank for rendering the latch ineffective subsequent to operating the first-mentioned means until the operation of the second-mentioned means.

8. In a machine of the class described, the combination of means for printing a plurality of items on a check, means for printing the totals of the items in duplicate, a perforating mechanism inactive during the item printing operations, and means for rendering the perforating mechanism active at the beginning of the total printing operation.

9. In a machine of the class described, the combination of a main operating device, means for printing a plurality of items on a check, means for printing the total of the said items in duplicate on said check, a perforating mechanism, disconnected from the main operating device during item printing operations, and means for connecting the perforating mechanism to said main operating device before the check is fed or printed during total printing operations.

10. In a machine of the class described, the combination of means for printing a plurality of items on a check, means for printing the total of the items on the check in duplicate, paper feed rolls, means for controlling the paper feed rolls to impart a short feed to the paper during item printing operations, means for controlling the paper feed rolls to impart a long feed to the paper during total printing operations, perforating mechanism inactive during item printing operations, and means under control of the last-mentioned means for rendering the perforator active.

11. In a machine of the class described, the combination of means for printing a plurality of items on a check, means for printing the total of the items on the check in duplicate, means for controlling the paper to impart a short feed thereto during item printing operations, means for controlling the paper to impart a long feed thereto during total printing operations, perforating mechanism inactive during item printing operations, and connections between the perforating mechanism and the last-mentioned means for rendering the perforator active to perforate the paper before the long feed occurs.

12. In a machine of the class described, the combination of means for printing a plurality of items on a check, means for controlling the printing means to print the total of the items on the check in duplicate, and means operable only upon operation of the second mentioned means for perforating the check at a point between the duplicate printed total.

13. In a machine of the class described, the combination of printing mechanism for printing on an issuing strip, manipulative means for controlling the issuing strip when printing single item transactions, another manipulative means for controlling the issuing strip when printing the total of a multiple item transaction, perforator mechanism normally ineffective, and means under control of either manipulative device for rendering the perforator effective.

14. In a machine of the class described, the combination of printing mechanism for printing on an issuing strip, manipulative means for controlling the issuing strip when printing single item transactions, another manipulative means for controlling the issuing strip when printing the total of a multiple item transaction, and means under control of both manipulative devices for rendering the perforator mechanism effective.

15. In a machine of the class described, the combination of item entering means, a subtotalizer, a plurality of classification totalizers, a manipulative device for determining when items are to be entered into the subtotalizer and the classification totalizers, another manipulative device for rendering the item entering means for both totalizers ineffective, and means to prevent operation of the last-mentioned manipulative device until an item has been entered into the subtotalizer.

16. In a machine of the class described, the combination of item entering means, a subtotalizer, a plurality of classification totalizers, means normally effective for printing the items entered in the subtotalizer, means normally ineffective for printing the total of the items in the subtotalizer, and a manipulative device for rendering the item entering means for both totalizers, and the means for printing the items ineffective, and for simultaneously moving the total printing means into effective position.

17. In a machine of the class described, the combination of impression means for printing multiple items on an issuing strip, another impression means for printing single items and totals of multiple items on the issuing strip, means for severing the strip after a single item or the total of multiple items has been printed in duplicate to produce separate checks, means for controlling the feed for the issuing strip to give it a long feed for the first item of a multiple item transaction, means for giving the issuing strip a short feed between the multiple items printed, means for giving the issuing strip two steps of feed when printing totals of the items, and when printing a single item transaction, and means for ejecting the check after it has been severed from the strip.

18. In a machine of the class described, the combination of means for printing on an issuing strip, a manipulative device for controlling the feed for the issuing strip, another manipulative device for controlling the feed of the issuing strip, means for severing a check from the strip, ejector means normally ineffective, and means under control of said manipulative devices for rendering the ejector means effective.

19. In a machine of the class described, the combination of means for printing a plurality of items on a check, means for feeding the check for each item printed, automatic controlling means for feeding the check a greater distance upon printing the first item, and automatic means for controlling said feeding means to feed the check twice for each cycle of the machine when printing the total of the items.

20. In a machine of the class described, the combination of a normally ineffective check feeding mechanism, means for rendering the mechanism operative to give the check a long feed, means for rendering the mechanism operative to give the check a short feed, and another means for rendering the mechanism operative to give the check two steps of feed.

21. In a machine of the class described, the combination of a check feed roll, an intermediate roll, means to contact the intermediate roll with the feed roll for giving the check a short feed, a latch holding the last-mentioned means in operative position for giving the check a longer feed, and means operable during the previous cycle of the machine for releasing the said latch.

22. In a machine of the class described, the combination of a check feed roll, an intermediate roll, means to contact the intermediate roll with the feed roll, means on the fed roll to operate the contact enforcing means, means for latching the contact enforcing means when the feed roll and intermediate roll are engaged, and means for preventing the contact enforcing means from being latched.

23. In a machine of the class described, the combination of a check feed roll, an intermediate roll, means to contact the intermediate roll with the feed roll to feed the check a short distance, and means for latching the contact enforcing means in position to feed the check a longer distance.

24. In a machine of the class described, the combination of a check feed roll, an intermediate roll, means to contact the intermediate roll with the feed roll to feed the check a plurality of steps during one cycle of the feed roll, another means for contacting the intermediate roll with the feed roll, and means for determining the length of feed when the last mentioned contacting means becomes effective.

25. The combination of a feed roll having two feed rails, an eccentric; an intermediate roll loosely mounted on the eccentric, an arm carrying a roller for effecting the contact of the intermediate roll with the feed roll, a lever for resiliently driving the arm, a stud on the feed roll adapted to rock the lever, a normally ineffective latch carried by the lever for locking the lever in its rocked position out of normal, a lug on the lever adapted to be engaged by the stud to release the lever, and means for determining when the latch is to be rendered effective.

26. In a machine of the class described, the combination of means to control the machine to print a plurality of successive items on a single check; means to control the machine to print the total of the plurality of items in duplicate on the check and clear the totalizer; means to control the machine to print single items in duplicate on a check; a cam having an open race; an arm carrying a knife to sever the check; an arm for operating the knife-carrying arm and carrying a roller disc engaged from the cam race while printing the plurality of successive items; and a device controlled by the third-mentioned means to move the roller into the cam race to cause the check to be severed when printing single item transactions, and controlled by the second-mentioned means to move the roller into the cam race to cause the check to be severed when printing the total of the plurality of successive items.

27. In a machine of the class described, the combination of means for printing a plurality of items on a check, means for feeding the check for each item printed, means to control the printing means to print the total of the items in duplicate, means to control the feeding means to feed the check two greater distances upon printing the total of the items, and means operable upon operation of the printing means when printing the duplicate total for perforating the check at a point between the duplicate printed total.

28. In a machine of the class described, the combination of means for printing a plurality of items and their total in duplicate on a check, means adapted to feed the check variable extents, means to control the feeding means to feed the check a certain distance for each item printed, means for controlling the feeding means to feed the check a greater distance before the first operation, and means to control the feeding means to feed the check twice and to different extents during the duplicate total printing operation.

29. In a machine of the class described, the combination of means for printing a plurality of items and their total in duplicate on a check, means adapted to feed the check strip variable extents, means to control the feeding means to feed the check strip a definite extent prior to the printing of the items and to feed the strip definite but different extents after the printing of each item, means to control the feeding means to feed the strip greater extents prior to the first of the duplicate total impressions, and to a still different extent prior to the second duplicate total impressions.

In testimony whereof I affix my signature.

JEAN RAWYLER.

CERTIFICATE OF CORRECTION.

Patent No. 1,819,038.  Granted August 18, 1931, to

JEAN RAWYLER.

It is hereby certified that error appears in the printed specification of the above numbered patent requiring correction as follows: Page 5, line 85, after "stud" insert the numeral 186; page 6, line 66, after "230" insert the word upon; page 7, line 26, after "cam" second occurrence insert the numeral 260; page 15, line 109, claim 17, after the word "item" insert a comma; page 16, line 80, claim 26, for "disc engaged" read disengaged; and that the said Letters Patent should be read with these corrections therein that the same may conform to the record of the case in the Patent Office.

Signed and sealed this 6th day of October, A. D. 1931.

M. J. Moore,
Acting Commissioner of Patents.

(Seal)